(12) United States Patent
Ström

(10) Patent No.: US 8,260,066 B2
(45) Date of Patent: Sep. 4, 2012

(54) IMAGE PROCESSING

(75) Inventor: Jacob Ström, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 982 days.

(21) Appl. No.: 12/226,478

(22) PCT Filed: Mar. 23, 2007

(86) PCT No.: PCT/SE2007/000291
§ 371 (c)(1),
(2), (4) Date: Oct. 20, 2008

(87) PCT Pub. No.: WO2007/123452
PCT Pub. Date: Nov. 1, 2007

(65) Prior Publication Data
US 2009/0202159 A1    Aug. 13, 2009

Related U.S. Application Data

(60) Provisional application No. 60/745,199, filed on Apr. 20, 2006.

(51) Int. Cl.
*G06K 9/36* (2006.01)
(52) U.S. Cl. ................................................. 382/232
(58) Field of Classification Search .................. None
See application file for complete search history.

(56) References Cited

U.S. PATENT DOCUMENTS

| | | | |
|---|---|---|---|
| 5,956,431 A | 9/1999 | Iourcha et al. | |
| 6,658,146 B1 | 12/2003 | Iourcha et al. | |
| 2003/0053706 A1 | 3/2003 | Hong et al. | |
| 2004/0130552 A1 | 7/2004 | Duluk, Jr. et al. | |
| 2005/0123207 A1* | 6/2005 | Marpe et al. | 382/239 |
| 2006/0210178 A1 | 9/2006 | Hong et al. | |

FOREIGN PATENT DOCUMENTS

| | | |
|---|---|---|
| WO | WO 98/27736 | 6/1998 |
| WO | WO 9827736 A2 * | 6/1998 |
| WO | 99/04368 | 1/1999 |
| WO | WO 99/04368 | 1/1999 |
| WO | 00/030040 | 5/2000 |
| WO | WO 00/30040 | 5/2000 |
| WO | 2006/006915 | 1/2006 |

(Continued)

OTHER PUBLICATIONS

International Search Report mailed Oct. 12, 2007 in corresponding PCT Application PCT/SE2007/000291.

(Continued)

*Primary Examiner* — Bhavesh Mehta
*Assistant Examiner* — Nirav G Patel
(74) *Attorney, Agent, or Firm* — Nixon & Vanderhye P.C.

(57) ABSTRACT

An image block comprising multiple image elements is compressed into at least one base codeword, interval codeword and index sequence. The respective bit-length of at least two of the codewords and the index sequence are dynamically defined based on the original vector components of the image elements, though the total bit length of the resulting compressed block is constant. The base codeword represents a base value and the interval codeword represents an interval. This interval encompasses multiple component values relative the base value. The index sequence is indicative of, for each image element, a component value selected from the multiple available values.

30 Claims, 11 Drawing Sheets

FOREIGN PATENT DOCUMENTS

| WO | WO 2006/006915 | 1/2006 |
|----|----------------|--------|
| WO | 2007/084062 | 7/2007 |
| WO | WO 2007/084062 | 7/2007 |

OTHER PUBLICATIONS

Translation of Chinese official action, Apr. 26, 2011, in corresponding Chinese Application No. 200780014215.7.

International Search Report for PCT/SE2007/000291, mailed Oct. 12, 2007.

Supplementary European Search Report mailed Jun. 16, 2009 in corresponding PCT Application PCT/SE2007/000291.

Kondo et al., "Adaptive Dynamic Range Coding Scheme for Future HDTV Digital VTR", Signal Processing of HDTV, III, Sep. 4, 1991, pp. 43-50, XP000379937.

http://www.ati.com/products/radeonx800/3DcWhitePaper.pdf, ATI™ Radeon™ X800 3Dc™ White Paper Munkberg et al., "High quality normal map compression", *Graphics Hardware*, Sep. 2006.

\* cited by examiner

| $W_X$ | $B_X$ | X-COMPONENT INDICES | $W_Y$ | $B_Y$ | Y-COMPONENT INDICES |
|---|---|---|---|---|---|
| 710 | 720 | 730 | 740 | 750 | 760 |

Fig. 3A ← 700

| $W_X$ | $B_X$ | X-COMPONENT INDICES | $W_Y$ | $B_Y$ | Y-COMPONENT INDICES |
|---|---|---|---|---|---|
| 710 | 720 | 730 | 740 | 750 | 760 |

Fig. 3B ← 700

| $W_X$ | $B_X$ | X-COMPONENT INDICES | $W_Y$ | $B_Y$ | Y-COMPONENT INDICES |
|---|---|---|---|---|---|
| 710 | 720 | 730 | 740 | 750 | 760 |

Fig. 3C ← 700

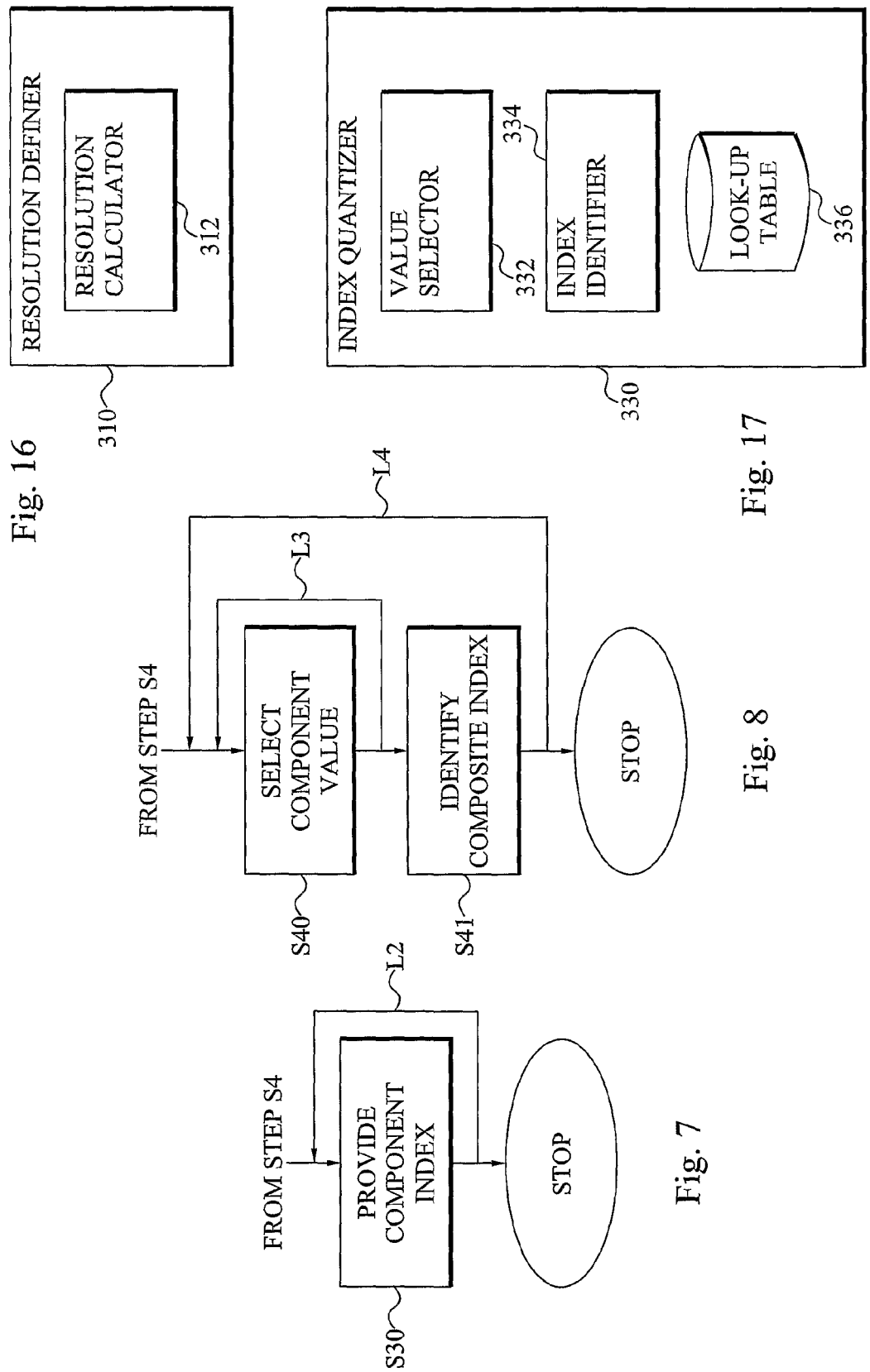

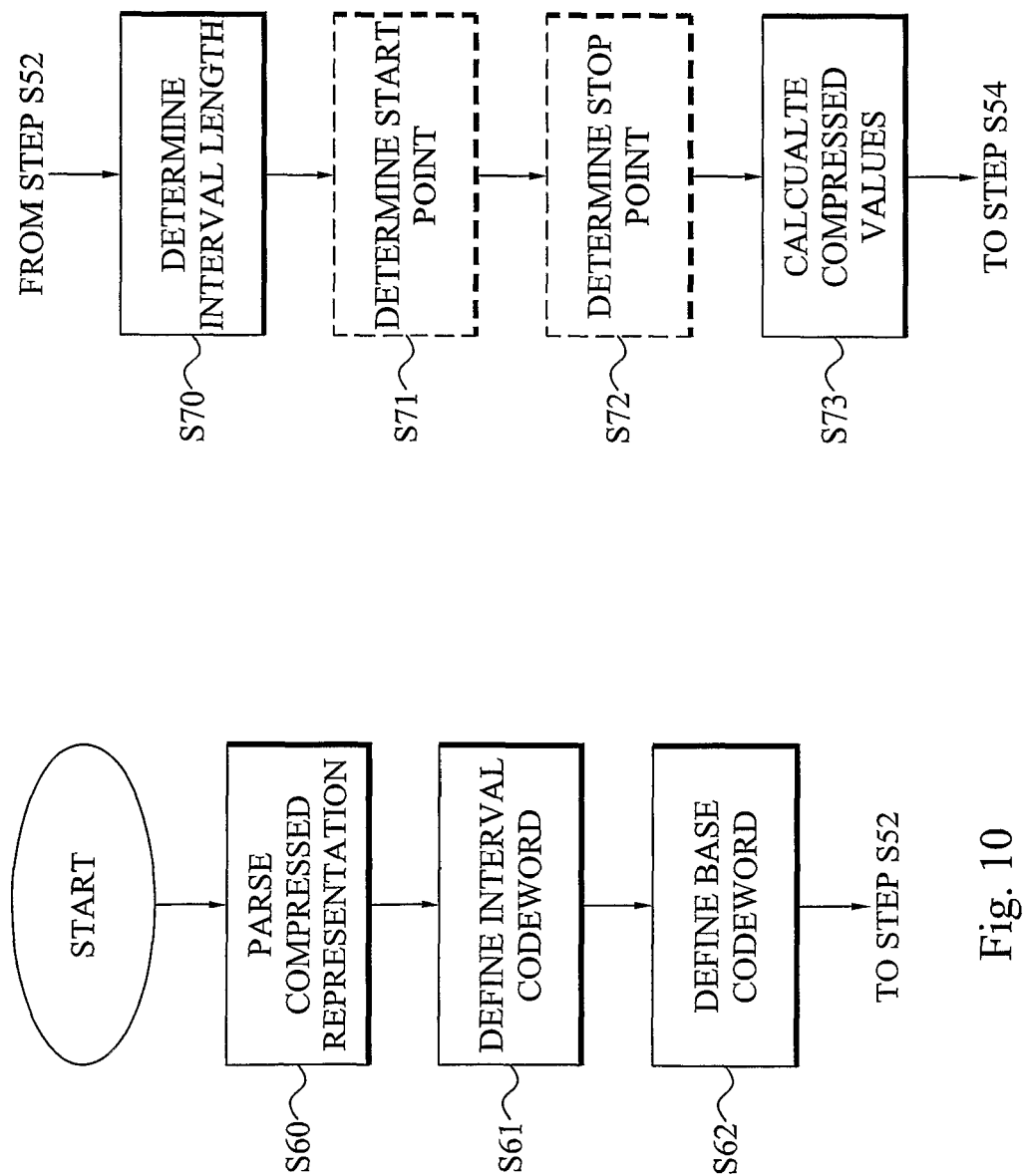

ize of $2^m \times 2^n$ image elements, where m=4−n and

IMAGE PROCESSING

This application is the U.S. national phase of International Application No. PCT/SE2007/000291, filed 23 Mar. 2007, which designated the U.S. and claims the benefit of U.S. Provisional Application No. 60/745,199, filed 20 Apr. 2006, the entire contents of each of which are hereby incorporated by reference.

TECHNICAL FIELD

The technical field generally refers to image processing, and in particular, to methods and systems for encoding and decoding images.

BACKGROUND

The real-time rendering of three-dimensional graphics has a number of appealing applications on mobile terminals, including games, man-machine interfaces, messaging and m-commerce. Since three-dimensional rendering is a computationally expensive task, dedicated hardware must often be built to reach sufficient performance. Innovative ways of lowering the complexity and bandwidth usage of this hardware architecture are thus of great importance.

The main bottleneck, especially for mobile phones, is memory bandwidth. A common technique for reducing memory bandwidth usage is texture compression. Texturing refers to the process of "gluing" images (here called textures) onto the rendered triangles. If the textures are compressed in memory, and then during accessing they are decompressed, a significant amount of bandwidth usage can be avoided.

Most texture compression schemes are concentrating on image-type data, such as photographs. However, with the advent of programmable shaders, textures have started to be used for many other types of data than just traditional photographic images. Bump mapping has therefore become a widespread technique which adds the illusion of detail to geometrical objects in an inexpensive way. More specifically, a texture, called a bump map or normal map, is used at each pixel to perturb the surface normal. A common approach to generate normal maps is to start with a high polygon count model and create a low complexity model using some geometrical simplification algorithm. The "difference" between these two models is then "baked" into a normal map. For real-time rendering, the normal map is applied to the low complexity model, giving it a more detailed appearance. For instance, the document [1] shows how it is possible to go from a very high triangle-count model (15 000 polygons) to a very low one (1 000 polygons) with preserved quality by using normal maps.

To be able to use lower polygon-count models is of course very attractive for mobile devices and terminals, since they have lower computational performance than PC systems.

However, one problem is that the texture compression methods available are created with photographic images in mind and do not work well when the data is something else, such as a normal map. For example, S3TC (same as DXTC) [2] has been employed for compressing normal maps, however, with block artifacts as a result, see document [1].

In the majority of cases today, bump mapping is performed in local tangent space (X, Y, Z), of each rendering primitive, e.g. a triangle. Since the length of the normal is not of interest, unit normals can be employed. Thus, the problem is to compress triplets (X, Y, Z), where $X^2+Y^2+Z^2=1$. The simplest scheme, is just to treat X, Y, Z as RGB (Red, Green, Blue) and compress it with S3TC/DXT1, but that gives rather bad quality.

Another way is to only compress X and Y, and then compute Z using equation 1:

$$Z = \sqrt{1-X^2-Y^2} \qquad (1)$$

By concentrating on X and Y it is possible to get a lower distortion. In order to enhance quality further, DXT5 can be used. Normally DXT5 is a version of S3TC used for alpha textures, i.e., RGBA textures, where RGB are coded together and the alpha component (A) is coded independently. Thus one approach has been to use the alpha channel to code X and the G channel to code Y. R and B have been unused in order to give maximum quality to G. However, that still does not give enough quality.

Actually, for smooth surfaces it turns out that even uncompressed RGB888/XYZ888 does not give enough quality for some objects. Especially for smooth surfaces, more than eight bits are needed. Therefore ATI Technologies developed 3Dc [1], which is a compression format that will often allow higher quality than XYZ888.

Just as in DXT5, only X and Y are compressed, and Z is calculated. X and Y are compressed separately. The X-values are grouped into blocks of 4×4 pixels. These values can range from −127.000 to +127.000, (or alternatively, from 0 to 255), but they are often clustered in an interval. 3Dc takes advantage of this and specifies this value using 16 bits: eight bits for the start of the interval and eight bits for the end of the interval.

Inside this interval, each value is specified using 3 bits each. This means that eight reconstruction levels within the interval are possible. The reconstruction levels are always equispaced (evenly spaced), reflecting an assumption that the distribution inside the interval is often close to uniform.

In total, 16 bits are used to specify the interval, and 3×16=48 bits are spent on specifying the reconstruction levels for the individual pixels. Thus, a 4×4 block of X-data is compressed to 64 bits. The same coding is valid for Y, and in total thus 128 bits are used, or 8 bits per pixel.

While 3Dc produces much better quality than DXT1 or DXT5, it may still not be enough. The interval is specified with 8 bits, and the smallest possible interval is when there is a difference of only one between start and end of the intervals, such as, for instance, the interval [77, 78] or [−3, −4]. In this case, there are eight reconstruction levels in between, meaning another three bits. Thus, the theoretically maximal resolution is 8+3=11 bits per component. This may not be enough for slowly varying surfaces.

SUMMARY

There is, thus, a general need for improving the quality when compressing and decompressing images in the form of normal maps and other types of images having image element associated property coordinates.

It is a general object to provide image encoding/compressing and image decoding/decompressing methods and system.

This and other objects are met by the invention as defined by the patent claims.

An image to be compressed is decomposed into a number of image blocks comprising multiple image elements (pixels, texture elements, texels, or volume elements, voxels). An image block preferably comprises sixteen image elements and has a size of $2^m \times 2^n$ image elements, where m=4−n and n=0, 1, 2, 3, 4 or $2^m \times 2^n 2^p$ image elements, where m, n, p=0, 1, 2, 3, 4 with the proviso that m, n, p are not all zero. Each image element in a block is characterized by a feature vector, having two or three feature vector components. The image blocks are then compressed.

According to the invention, an image to be compressed is decomposed into a number of image blocks comprising multiple image elements (pixels, texture elements, texels, or volume elements, voxels). An image block preferably comprises sixteen image elements and has a size of $2^m \times 2^n$ image elements, where m=4−n and n=0, 1, 2, 3, 4 or $2^m \times 2^n 2^p$ image elements, where m, n, p=0, 1, 2, 3, 4 with the proviso that m, n, p are not all zero. Each image element in a block is characterized by a feature vector, having two or three feature vector components. The image blocks are then compressed.

In the block compression a respective bit resolution is dynamically defined for each vector component and for at least two of a base codeword, an interval codeword and an index sequence. This bit resolution or bit length selection is performed on a block basis, meaning that a first image block could have a given length of its first base codeword, whereas a second image block has another bit length of its first base codeword. Despite this variable bit length coding, the total respective sizes of the compressed blocks are constant and equal. This means, for instance, that by spending more bits on an interval codeword, fewer bits can be used for the base codeword relating to the same vector component.

The base codeword is determined as a representation of a base value based on at least a portion of the vector components of the image elements in the block. Correspondingly, the interval codeword is determined as a representation of an interval encompassing multiple component values relative the base value. This interval codeword is also determined based on at least a portion of the vector components in the block. The index sequence is determined to be indicative of, for each image element in the block, of a component value selected from the multiple component values.

As each image element is preferably associated with at least two vector components, such as an X and a Y component, first (X) and second (Y) base codewords, first (X) and second (Y) interval codewords and first (X) and second (Y) index sequences are preferably generated and together form the compressed image block. Due to the variable bit length coding, the bit lengths of the first and second base codewords do not necessarily have to be the same for a given block and can further differ between different image blocks. The same is true for the first and second interval codewords.

In the decompression, one of the base codeword and interval codeword is identified in the compressed block based on a bit pattern of at least a portion of the bit sequence constituting the compressed block. This identification is preferably performed by parsing through a selected portion of the bit sequence until a given bit pattern is reached. The parsed portion then preferably forms or constitutes a basis of the base codeword or the interval codeword. The other of the base and interval codewords can then be identified based on the other codeword sequence.

Once the codewords have been identified, a base value is determined based on the base codeword and an interval length is determined based on the interval codeword. The multiple component values available for the current block are calculated from the base value, which defines the position of the interval, and the interval length, which defines the size of the interval. The index sequence is then used for identifying, for each image element to be decoded, which of these multiple component values to use as a representation of the original (X or Y) vector component for that image element.

SHORT DESCRIPTION OF THE DRAWINGS

FIGS. 3A to 3C illustrate different embodiments of compressed representations of an image block;

FIG. 7 is a flow diagram illustrating an embodiment of the step of determining the index sequence of FIG. 1 in more detail;

FIG. 8 is a flow diagram illustrating another embodiment of the step of determining the index sequence of FIG. 1 in more detail;

FIG. 10 is a flow diagram illustrating an embodiment of the steps of identifying the codewords of FIG. 9 in more detail;

FIG. 11 is a flow diagram illustrating an embodiment of the step of determining the component values of FIG. 9 in more detail;

Figure 13:
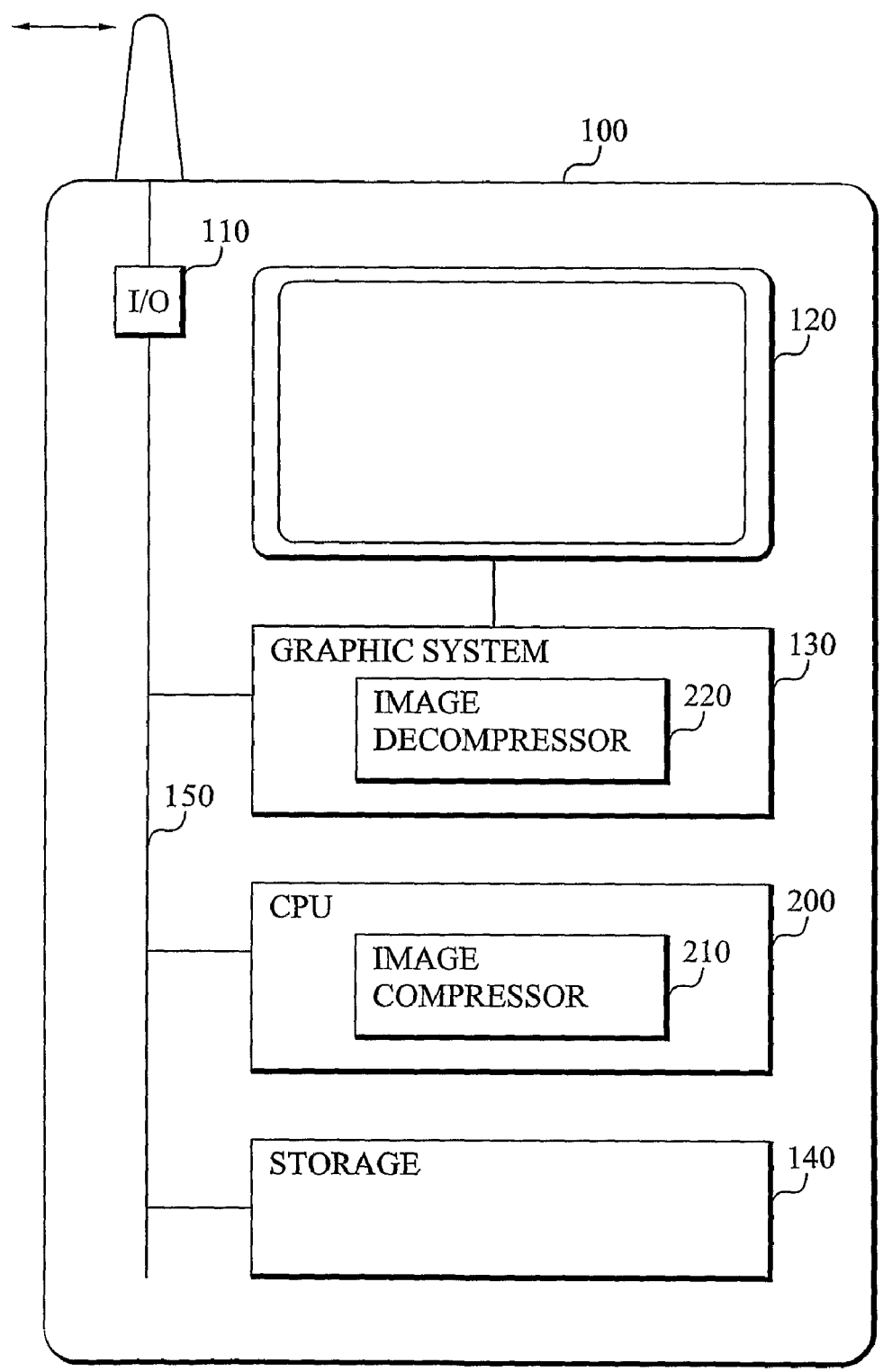
Figure 15:
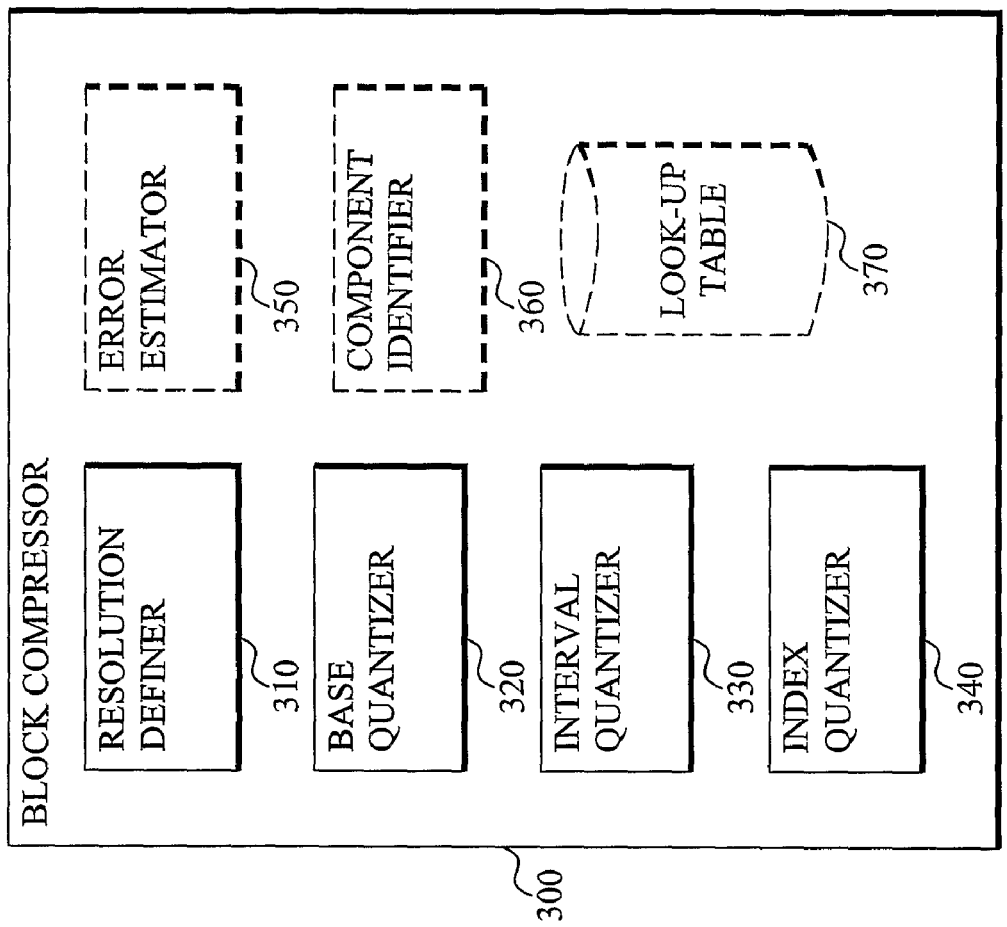
Figure 14:
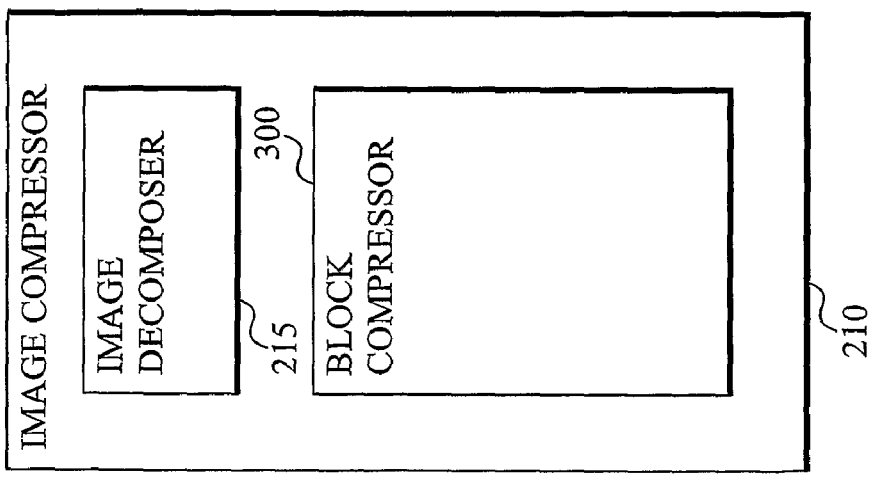
Figure 19:
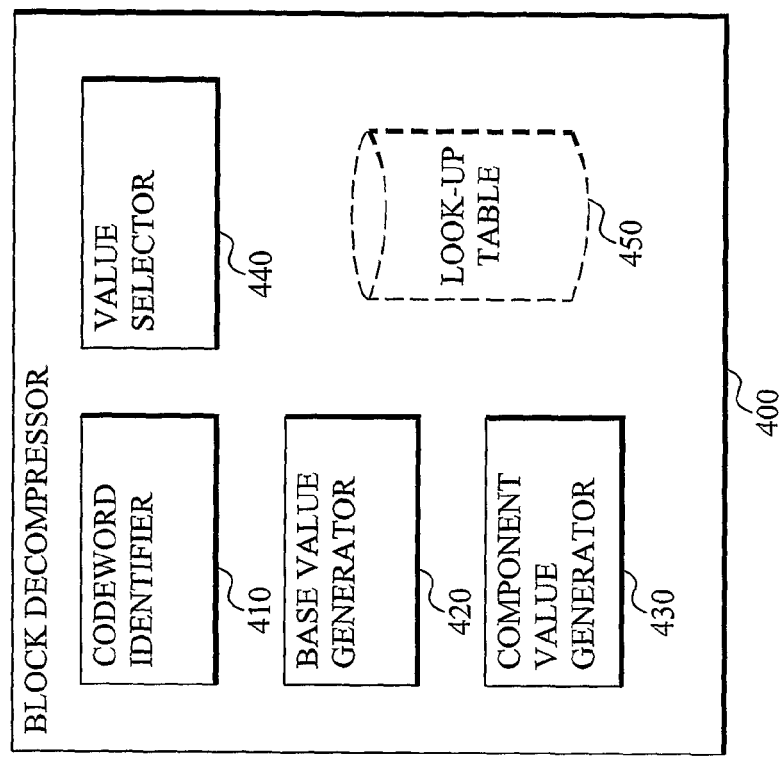
Figure 18:
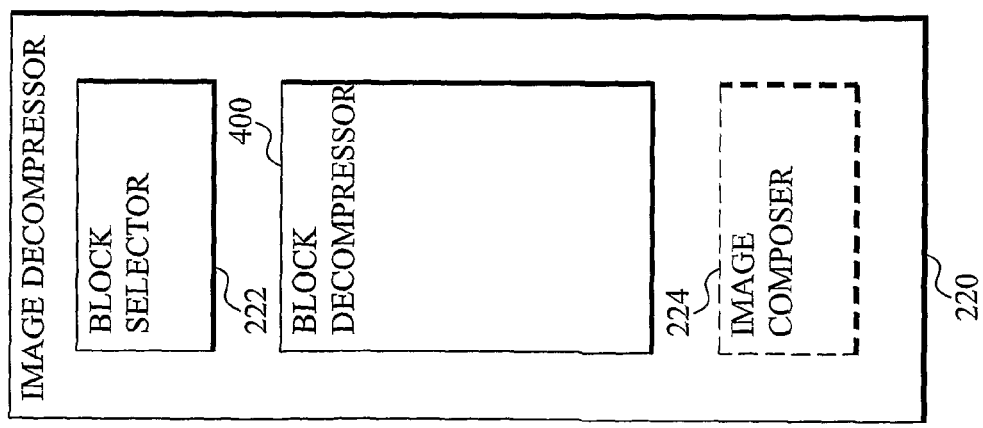
Figure 21:
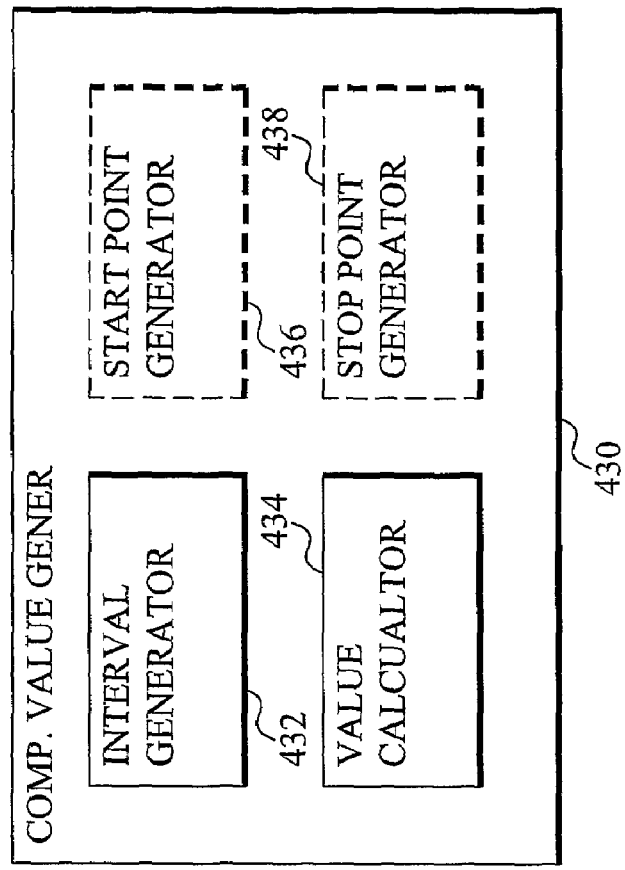
Figure 20:
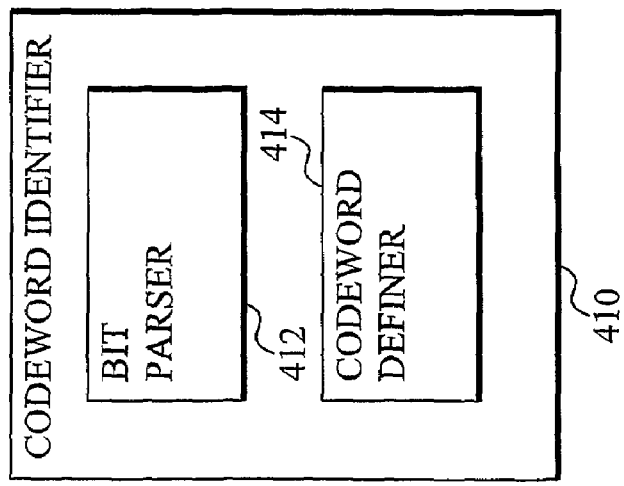

FIG. 13 schematically illustrates an example of a user terminal with an image compressor and decompressor;

FIG. 14 is a block diagram schematically illustrating an embodiment of an image compressor;

FIG. 15 is a block diagram schematically illustrating an embodiment of an image compressor;

FIG. 16 is a block diagram schematically illustrating an embodiment of the resolution definer of FIG. 15 in more detail;

FIG. 17 is a block diagram schematically illustrating an embodiment of the index quantizer of FIG. 15 in more detail;

FIG. 18 is a block diagram schematically illustrating an embodiment of an image decompressor;

FIG. 19 is a block diagram schematically illustrating an embodiment of a block decompressor;

FIG. 20 is a block diagram schematically illustrating an embodiment of the codeword identifier of FIG. 19 in more detail; and FIG. 21 is a block diagram schematically illustrating an embodiment of the component value generator of FIG. 19 in more detail.

DETAILED DESCRIPTION OF EXAMPLE, NON-LIMITING EMBODIMENTS

Throughout the drawings, the same reference characters will be used for corresponding or similar elements.

The relates to image and graphic processing, and in particular to encoding or compressing images and image blocks and decoding or decompressing encoded (compressed) images and image blocks.

Generally, during image compression, an image is decomposed or divided into a number of image blocks or tiles. Each such image block then comprises multiple image elements having certain image element associated properties or features. The image blocks are compressed to generate an compressed representation of the image.

When an encoded image or graphic primitive subsequently is to be rendered, e.g. displayed on a screen, the relevant image elements of the compressed image blocks are identified and decompressed. These decompressed image elements are then used to generate a decompressed representation of the original image or graphics primitive.

The technology is well adapted for usage with three-dimensional (3D) graphics, such as games, 3D maps and scenes, 3D messages, e.g. animated messages, screen savers, man-machine interfaces (MMIs), etc., but is not limited thereto. Thus, the technology could also be employed for compressing other types of images or graphics, e.g. one-dimensional (1D), two-dimensional (2D) or 3D images.

The technology is in particular suitable for handling bump or normal maps, or images. As is well-known in the art, a normal or surface normal denotes a 3D vector which is perpendicular to the surface (for a flat surface) or perpendicular to the tangent plane of the surface (for a non-flat surface).

In 3D graphics processing, typically several triangles are created and the corresponding screen coordinates of the corners of these triangles are determined. Onto each triangle, an image (or portion of an image), or a so-called texture, is mapped ("glued"). The management of textures is, though, costly for a graphic system, both in terms of utilized memory for storage of textures and in terms of memory bandwidth during memory accesses, when textures are fetched from the memory. This is a problem particularly for thin clients, such as mobile units and telephones, with limited memory capacity and bandwidth. As a consequence, a texture or image encoding scheme is often employed. In such a scheme, a texture is typically decomposed or divided into a number of image blocks comprising multiple texels. The image blocks are then compressed and stored in a memory. Note that the size of an compressed (version of an) image block is smaller than the corresponding size of the uncompressed version of the image block.

The expression "image element" refers to an element in an image block or compressed representation of an image block. This image block, in turn, corresponds to a portion of an image or texture. Thus, an image element could be a texel (texture element) of a (1D, 2D, 3D) texture, a pixel of a (1D or 2D) image or a voxel (volume element) of a 3D image. Generally, an image element is characterized by certain image-element properties or features. Each image element has a feature vector representing a feature associated with the image elements. This feature could control or influence the appearance of an image element. A preferred embodiment of such a feature vector is a surface normal, more preferably a normalized surface normal. Such a surface normal has three vector components or coordinates, i.e. X-, Y- and Z-components. However, it is generally enough to only specify two of the normal coordinates, such as X- and Y-coordinates per image element, as the remaining coordinate can be calculated therefrom, such as using equation 1 above.

Furthermore, in the following, the term "image" is used to denote any 1D, 2D or 3D image or texture that can be encoded and decoded, including but not limited to bump maps, normal maps, photos, game type textures, text, drawings, high dynamic range images and textures, etc.

The Image processing is provided that is in particular suitable for compressing and decompressing images and image blocks, where each image element has a two dimensional feature vector. In a preferred example implementation, the two vector components represent two coordinates of a normalized surface normal, such as the X- and Y-coordinates (or X- and Z-coordinates or Y- and Z-coordinates). The following is described in connection with a feature vector comprising an X component and a Y component. However, this should merely be seen as an illustrative example as any other combination of two of the X, Y, Z components could instead be used. If non-normalized normals are employed, the third component is simply added and processed in a similar manner to the other two components as described herein.

The technology described in this application takes a radically different approach as compared to the prior art normal map compressing techniques, such as 3Dc [1] by using variable and dynamic bit length coding inside a fixed rate compression system. This means that the respectively sizes (bit-resolutions or bit-lengths) of the codewords used for representing an image block are variable, while the total size in terms of number of bits of the compressed block representation remains constant. This allows for a dynamic adaptation in the accuracy of positioning an interval encompassing multiple component values but also a dynamic adaptation in the resolution of that interval. As a consequence, an increased positioning accuracy is achieved (at the cost of interval resolution) for those image blocks, where this leads to an improved image quality, while increasing the interval resolution (at the cost of positioning accuracy) for other image blocks. In summary, an appropriate positioning accuracy and interval resolution can therefore be independently determined for each image block, resulting in a total increase in quality of the resulting decompressed image.

For example, in 3Dc [1] small intervals has a very course granularity when it comes to the width of the intervals. The smallest representable interval width of 3Dc is 1, whereas the next smallest interval width is 2. Thus, there is a doubling in size when going to a next larger interval. This should be compared to the situation of an interval width of, for example, 100 and going to the next larger interval width of 101. In this case, the size is increased with only 1% and not 100%.

Another problem of small intervals in 3Dc is that the position of the interval cannot be specified with great accuracy. If the smallest interval is moved, it has to be moved an entire step, for example from [3, 4] to [4, 5]. This step size is about eight times larger than the distance between the eight component values inside the interval. On the other hand, for an interval width of 100, such as [3, 103], the smallest translation, such as to [4, 104], is more than one order of magnitude smaller than the distance between the eight component values of the interval.

The technology described in this application can solve this and other similar problems by the variable codeword length coding. This allows, for example, that both the granularity with which the interval width is specified and the granularity with which the interval translation is specified could be set equal to the distance between the possible vector values.

Compression

Figures 1, 4:
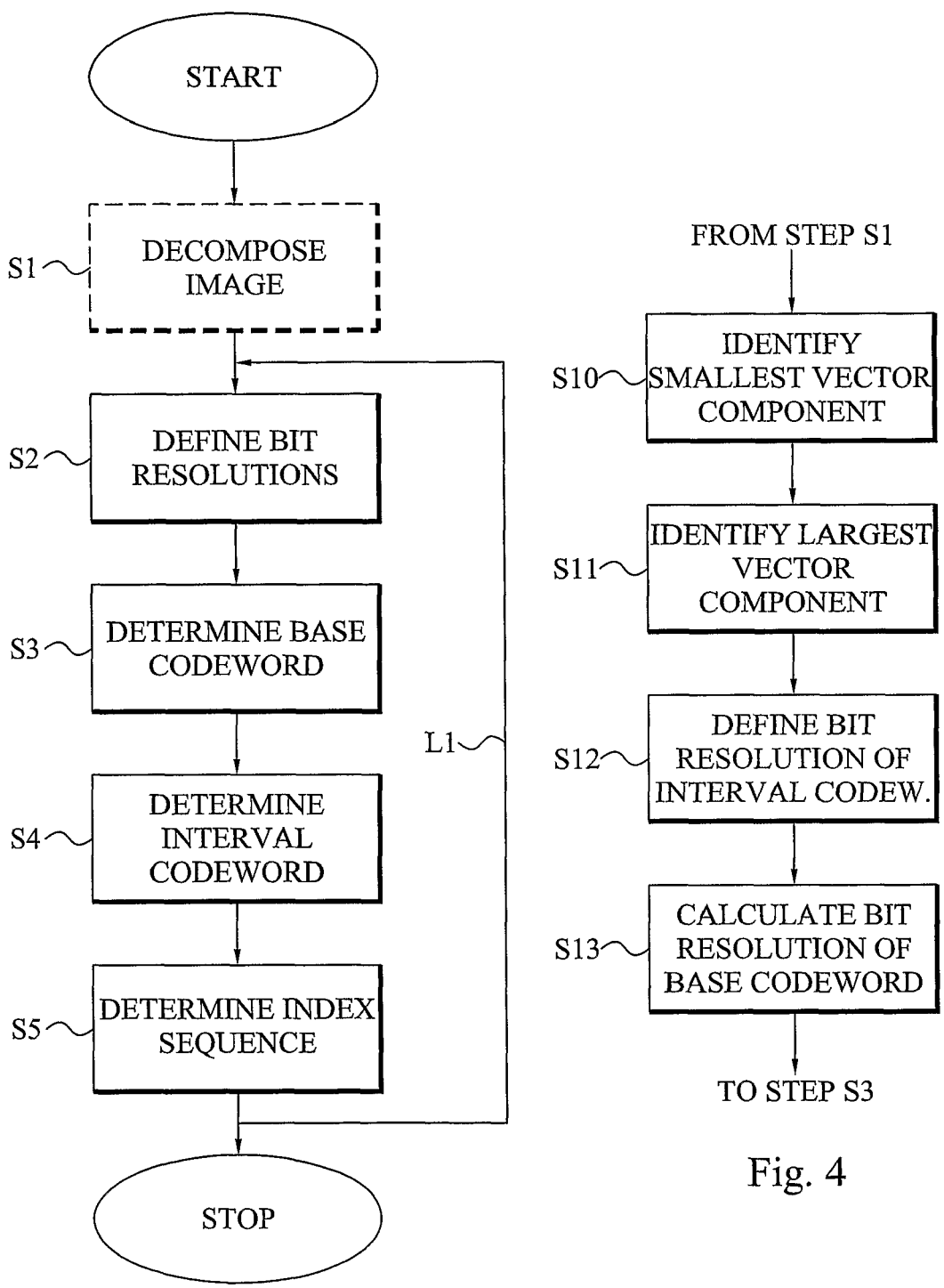
FIG. 1 is a flow diagram illustrating an image compression method and an image block compression method according to an embodiment.
FIG. 4 is a flow diagram illustrating an embodiment of the step of defining bit resolutions of FIG. 1 in more detail.
Figure 2:
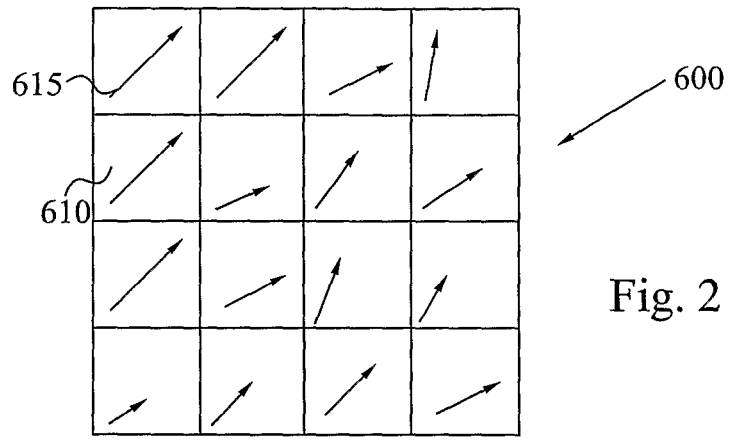
FIG. 2 illustrates an embodiment of an image block.

FIG. 1 illustrates a (lossy) method of compressing an image. In a first step S1, the image is decomposed or divided into a number of image blocks. Each such image block comprises multiple, i.e. at least two, image elements. In an example embodiment, an image block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an image block of size $2^m \times 2^n$ or $2^m \times 2^n \times 2^p$ image elements, where m, n, p are zero or positive integers with the proviso that not all of m, n, p may simultaneously be zero. FIG. 2 schematically illustrates an example of an image block 600 with sixteen image elements 610. The figure also schematically illustrates the different feature vectors 615 associated with the image elements 610. Returning to FIG. 1, the whole image block is preferably decomposed into (non-overlapping) image blocks in step S1. However, in some applications, only a portion of an image is compressed and, thus, only this portion is decomposed into image blocks.

The following steps S2 and S5 perform a compression of the image blocks. As was noted in the foregoing, each image elements in an image block have a respective feature vector, preferably a 2D feature vector. The compression of these feature vectors can be performed by processing the two feature vector component types independently. In other words, processing the X components and processing the Y components in parallel or sequentially. In the following, the compression of one of the vector components, such as X component, is described in more detail. The same procedure can then be performed also for the other vector component, such as Y component, or the other vector components, such as Y and Z components. It is, though, possible to perform a combined processing of the X and Y. This will be described in more detail further on.

In step S2 a respective bit resolution of the including components of the compressed block representation to be determined is defined. These including components comprise, for the X component, a base codeword, an interval codeword and an index sequence. This bit resolution definition of step S2 is performed based on at least a portion of the X vector components of the feature vectors in the block, more preferably based on all the X vector components. As a consequence, the respective size in terms of number of bits of at least two of the base codeword, interval codeword and index sequence can be variable and is defined in step S2. However, although the different such codeword and/or index bit-lengths can be defined for different image blocks, the total size (bit length) of these three components is fixed. Thus, let L(B) denote the bit-length of the base codeword, L(W) denote the corresponding bit-length of the interval codeword and L(I) denote the bit length of the index sequence. In a first embodiment:

$$L(B)+L(W)+L(I)=k \quad (2)$$

where k is a constant. In a second embodiment:

$$L(B)+L(W)=m \quad (3)$$

$$L(I)=n$$

where m, n are constants. In a preferred implementation, k=64 bits, m=16 bits and n=48 bits. As the image elements comprise both X and Y components, these equations 2 and 3 can be rewritten as:

$$L(B_X)+L(B_Y)+L(W_X)+L(W_Y)+L(I_X)+L(I_Y)=p \quad (4)$$

where the subscript X or Y denote the particular vector component of the codewords of index sequence and p is a constant, preferably p=128 bits. In another embodiment:

$$L(B_X)+L(B_Y)+L(W_X)+L(W_Y)=q$$

$$L(I_X)=t_1 \quad (5)$$

$$L(I_Y)=t_2$$

where q, $t_1$, $t_2$ are constants and $t_1$ is preferably equal to $t_2$, preferably q=32 bits, $t_1$=$t_2$=48 bits. In a preferred implementation $L(B_X)+L(W_X)+L(I_X)=L(B_Y)+L(W_Y)+L(I_Y)$.

In a next step S3, the base codeword is determined as a representation of a base value based on at least a portion of the (X) vector components. This determination of step S3 is preferably also performed based on the bit resolution (L(B)) defined for the base codeword. Alternatively, the definition of the bit resolution for the base codeword and the determination of the actual bit codeword could be performed collectively in a single procedure based on at least a portion of the vector components. This base value is an (X) value that defines the position of an interval defined by the interval codeword. In a preferred implementation the base value represents a mid point of the interval. In other embodiments, the base value could represent the start or end point of the interval. This concept can be extended further so that the base value could actually be any value inside the interval or actually any value inside the range of allowable values, such as [0, 1], [0, 255], [−1, 1], [−127, 127] or some other interval, that can be used for positioning the interval.

Step S4 determines the interval codeword as a representation of an interval encompassing multiple component values relative the base value. This codeword determination is performed based on at least a portion of the (X) vector components. In a preferred embodiment, this determination of step S4 is also performed at least partly based on the bit resolution (L(W)) defined for the interval codeword in step S2. Alternatively, the definition of bit resolution for the interval codeword and the actual determination of the interval codeword could be performed collectively in a single procedure. This interval codeword is preferably a representation of an interval length that is used together with the base value represented by the base codeword for specifying the start and stop (X) values of the interval. This interval then encompassed multiple component values, such as eight component values.

The order of performing step S3 and S4 can be exchanged, i.e. first determining the interval codeword (step S4) and then determining the base codeword (step S3). Furthermore, the two steps S3 and S4 could alternatively be performed in parallel.

In a next step S5, an index sequence is determined. This determination is preferably performed at least partly based on the bit resolution defined for the sequence in step S2. Alternatively, the index sequence determination and the bit resolution definition for the index sequence can be performed collectively in a single procedure. The index sequence is indicative of, for each image element in the block, a component value selected from the multiple component values encompassed by the interval. In this step S5, thus, a (X) component value is selected for an image element in the block and is used as a representation of the "true" (X) vector component of that image element.

The result of the steps S2 to S5 is a compression of the first (X) vector component of the image elements. The same procedures are preferably performed sequentially or in parallel for the second (Y) vector component. The result of the encoding of steps S2 to S5 is then a compressed image block or more precisely a compressed representation of the image block. Such an compressed block representation 700 is illustrated in FIGS. 3A to 3C. The representation 700 comprises a first (X) base codeword 720, a first (X) interval codeword 710, a first sequence 730 of (X) component indices, a second (Y) base codeword 750, a second (Y) interval codeword 740 and a second sequence 760 of (Y) component indices. Note that the mutual order of the codewords 710, 720, 740 and 750 and the index sequences 730, 760 of the compressed image block 700 may differ from what is illustrated in the figure.

The dynamic and variable bit resolution determination is evident when comparing the compressed representations of FIGS. 3A to 3C. In FIGS. 3A and 3B the X and Y index sequences 730, 760 have a constant bit length. However, the bit resolution of the base codewords 720, 750 and interval codewords 710, 740 can be independently defined for different image blocks and also for the two vector components.

When comparing FIG. 3B with FIG. 3A, it is clear that the bit resolution of the X interval codeword 710 is lower in FIG. 3B than in FIG. 3A, while the X base codeword 720 is larger. The opposite is true for the Y codewords 740, 750.

In FIG. 3C, also the number of bits spent for the X and Y index sequences 730, 740 can be selected. When comparing FIG. 3A with 3C, the compressed block of FIG. 3C spends comparatively more bits on the X index sequence 730.

However, the total sizes of the two compressed block representations 700 are equal in the figures. This size is preferably 128 bits. In a preferred implementation the number of bits spent for the X codewords 710, 720 and the X index sequence 730 is preferably the same as the total number of bits of the Y codewords 740, 750 and Y index sequence 760, i.e. 64 bits.

Returning to FIG. 1, steps S2 to S5 are preferably repeated for all image blocks provided during the decomposing of step S1 (schematically illustrated by line L1). Note that due to the dynamic bit resolution selection, the resulting different compressed blocks can spend different number of bits on the codewords and/or index sequences, though the total sizes of the compressed blocks in terms of bits are the same. The result is then a sequence or file of compressed image blocks. The resulting compressed image blocks could be ordered in a file from left to right and top to bottom in the same order in which they were broken down in the block decomposing of step S1. The method then ends.

The compressed image can be provided to a memory for storage therein until a subsequent rendering, e.g. display, of the image. Furthermore, the compressed image can be provided as a signal of compressed block representations to a transmitter for (wireless or wired) transmission to another unit.

FIG. 4 is a flow diagram illustrating an embodiment of the defining step of FIG. 1 in more detail. In this embodiment, the definition of bit resolutions for at least two of the base codeword, interval codeword and index sequence is performed based on the distribution of the (X or Y) vector components of the feature vectors in the image block. Thus, a first component distribution would then result in first respective bit lengths of the base codeword, interval codeword and optionally the index sequence, while a second component distribution could give second different respective bit lengths of the codewords and optionally the index sequence.

The method continues from step S1 of FIG. 1. In a next step S10 a smallest (X or Y) vector component of the feature vectors in the block is identified. A next step S11, correspondingly identifies the largest (X or Y) vector component in the block. These two vector components can then be used as a representation of the distribution of the (X or Y) vector components in the block. Therefore a comparison of the smallest and largest vector component can be used for defining the bit resolutions for the codewords and/or index sequence.

In a preferred implementation, the bit resolution for the interval codeword is first defined based on the vector components in the block and more preferably based on the smallest and largest vector components identified in steps S10 and S11. This is illustrated in step S12. The definition of the interval codeword resolution in step S12 can be conducted by investigating a set or look-up table of different predefined interval lengths, where each such interval length is associated with a given interval codeword. Furthermore, at least some of the interval codewords in the set/table have different respective bit resolutions. In such a case, the difference between the largest and smallest component value is preferably calculated. The predefined width length in the set or table that is closest to the calculated difference is then selected. This in turn gives the interval codeword to use for the current image block and also the bit-resolution of that codeword. This is described further below. In this approach, a combined determination of interval codeword and interval codeword resolution is therefore conducted.

In an alternative approach, the difference between largest and smallest vector components is input to a function or used as input in a set or table look-up procedure for determining the interval codeword bit resolution. In such a case, the function or table could specify different codeword resolutions for different ranges of differences.

In a next step S13, the bit resolution for the base codeword is calculated from the bit resolution determined for the interval codeword in step S12 and from a predefined maximum resolution value. This means that the base codeword resolution is obtained as a difference between the maximum value and the determined interval codeword resolution. In a preferred embodiment this predefined maximum resolution value is 16. This embodiment therefore provides a low (high) bit resolution of the base codeword in the case the interval codeword resolution is high (low). The method then continues to step S3 of FIG. 1.

Figure 5:
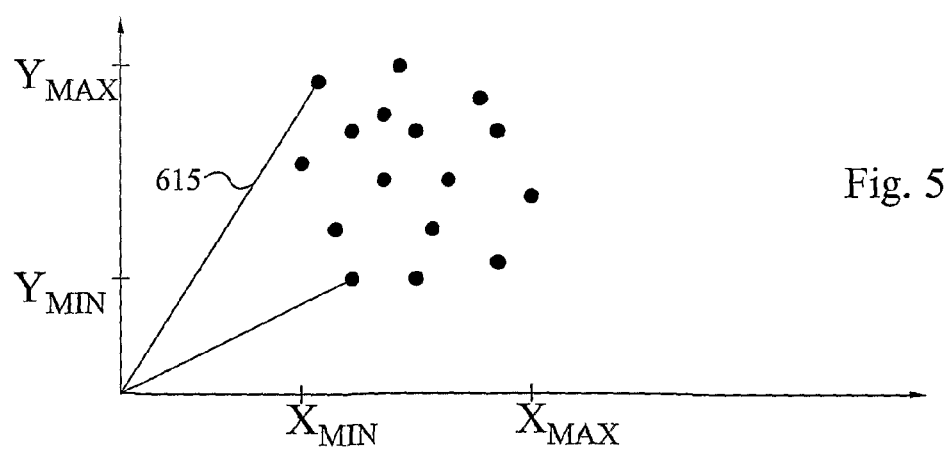
FIG. 5 is a diagram illustrating distribution of vector components in the X, Y plane.

FIG. 5 is a diagram illustrating the X-Y plane in the coordinate space. Each image element of the image block has a respective feature vector 615 (surface normal) with an X- and Y-coordinate. In the figure it is assumed that there are sixteen image elements per block, e.g. as illustrated in FIG. 2. Thus, the figure comprises sixteen marked points representing the X- and Y-coordinates of the image elements. In addition, only two feature vectors 615 have been indicated to make the figure clearer. The figure also indicates the smallest ($X_{min}$, $Y_{min}$) and largest ($X_{max}$, $Y_{max}$) vector components in the block.

Figure 6:
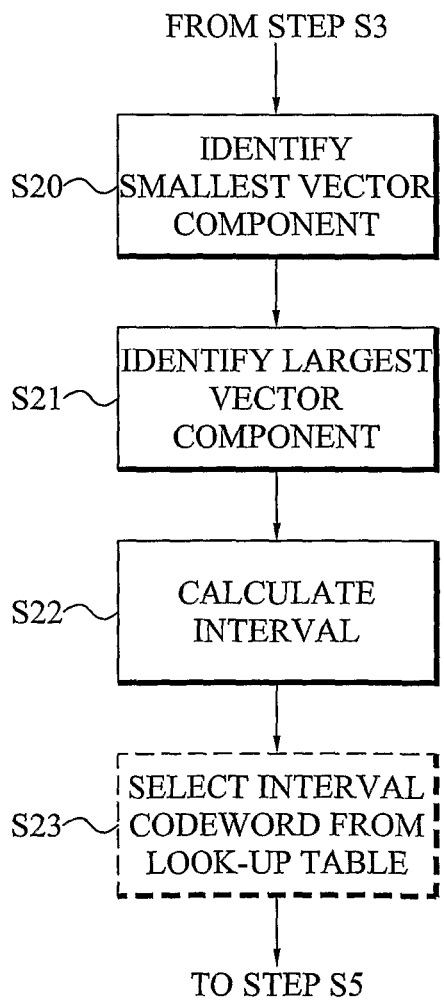
FIG. 6 is a flow diagram illustrating an embodiment of the step of determining the interval codeword of FIG. 1 in more detail.

FIG. 6 is a flow diagram illustrating an embodiment of the determination of the interval codeword in FIG. 1. The method continues from step S3 of FIG. 1. In a next step S20, the smallest (X or Y) vector component of the image block is identified. This step corresponds to step S10 of FIG. 4. A next step S21 corresponds to step S11 of FIG. 4 and identifies the largest (X or Y) vector component. The next step S22 determines the interval codeword as a representation of the difference between the largest and smallest vector component.

This step S22 is preferably performed by calculating the difference between the two vector components and then step S23 identifies a suitable interval codeword from a set or table of multiple predefined interval codewords. Furthermore, the component difference could be input to a function that outputs the desired interval codeword in step S23. The set/table then contains or the function has access to multiple different interval codewords, where at least some of the codewords have different bit lengths (resolutions). Table I below is an example of such a look-up table for the interval codeword.

TABLE I

Interval codewords and codeword resolutions

| Width | $W_X/W_Y$ | $L(W_X)/L(W_Y)$ | $L(B_X)/L(B_Y)$ |
|---|---|---|---|
| 1/16 | 0 | 1 | 15 |
| 1/8 | 10 | 2 | 14 |
| 1/4 | 110 | 3 | 13 |
| 1/2 | 1110 | 4 | 12 |
| 1 | 11110 | 5 | 11 |
| 2 | 111110 | 6 | 10 |
| 4 | 1111110 | 7 | 9 |
| 8 | 11111110 | 8 | 8 |
| 16 | 111111110 | 9 | 7 |
| 32 | 1111111110 | 10 | 6 |

TABLE I-continued

Interval codewords and codeword resolutions

| Width | $W_X/W_Y$ | $L(W_X)/L(W_Y)$ | $L(B_X)/L(B_Y)$ |
|---|---|---|---|
| 64 | 11111111110 | 11 | 5 |
| 128 | 111111111110 | 12 | 4 |
| 256 | 111111111111 | 12 | 4 |

In this illustrative Table I, the distance between the component values encompassed by the interval is equal to the smallest distance with which the interval can be moved. For example, if the distance between the largest and smallest component values is equal to or close to 128, an interval length of 128 is selected. The distance between the multiple component values is then 128/8=16 in the case of eight component values. Four bits are available for specifying the base value and the position of the interval, which means that it can be specified at an accuracy of $256/2^4=16$. Therefore the distance between the component values is equal to the smallest distance which the interval can be moved. This is true for all possible interval lengths in Table I.

Table I should merely be seen as an illustrative table that can be used. If, for example, higher precision of the base value is desired, the smallest representable interval could be ¼ instead of ¹⁄₁₆, releasing two bits that can be used to increase the bit-resolution of the base codeword.

Another possibility is to use released bits to increase the granularity in the interval. Normally, eight equidistanced component values are available in the determined interval, typically as linear combinations of the start value and end value of the interval. If the base value represents the midpoint (M) of the interval, the eight component values can be calculated as:

$$\text{component value} = M + \text{length} \times \left(-\frac{7}{14}, -\frac{5}{14}, -\frac{3}{14}, -\frac{1}{14}, \frac{1}{14}, \frac{3}{14}, \frac{5}{14}, \frac{7}{14}\right) \quad (6)$$

The set presented in the parenthesis of equation 6 can be exchanged to another one and the released bit(s) can be used for signaling between which particular set that should be used. The compressed block then comprises a codeword for signaling which particular set to use. A bit value of $0_{bin}$ for that codeword could then represent the set $$\left(-\frac{7}{14}, -\frac{5}{14}, -\frac{3}{14}, -\frac{1}{14}, \frac{1}{14}, \frac{3}{14}, \frac{5}{14}, \frac{7}{14}\right),$$

whereas $1_{bin}$ represents $$\left(-\frac{7}{14}, -\frac{5}{14}, -\frac{3}{14}, -\frac{1}{14}, \frac{1}{14}, \frac{3}{14}, \frac{5}{14}, \frac{7}{14}\right) \times \sqrt{2}.$$

that the interval size doubles every two steps instead of every step. If the signaling codeword comprises two bits, the following sets could instead be available for calculating different reconstruction levels:

TABLE II usage of different reconstruction sets

| Codeword | Set |
|---|---|
| $00_{bin}$ | $\left(-\frac{7}{14}, -\frac{5}{14}, -\frac{3}{14}, -\frac{1}{14}, \frac{1}{14}, \frac{3}{14}, \frac{5}{14}, \frac{7}{14}\right)$ |
| $01_{bin}$ | $\left(-\frac{7}{14}, -\frac{5}{14}, -\frac{3}{14}, -\frac{1}{14}, \frac{1}{14}, \frac{3}{14}, \frac{5}{14}, \frac{7}{14}\right) \times \sqrt{\sqrt{2}}$ |
| $10_{bin}$ | $\left(-\frac{7}{14}, -\frac{5}{14}, -\frac{3}{14}, -\frac{1}{14}, \frac{1}{14}, \frac{3}{14}, \frac{5}{14}, \frac{7}{14}\right) \times \sqrt{2}$ |
| $11_{bin}$ | $\left(-\frac{7}{14}, -\frac{5}{14}, -\frac{3}{14}, -\frac{1}{14}, \frac{1}{14}, \frac{3}{14}, \frac{5}{14}, \frac{7}{14}\right) \times \sqrt{2} \times \sqrt{\sqrt{2}}$ |

This means that the interval length will double in four steps. In practice, the Table II will be used together with Table I or another such table, where Table I specifies the interval length and codeword and Table II specifies how the component values are calculated from the interval length and the base value.

This technique can also be extended to use different types of sets with the same width. In Table II, the resulting component values will all be equispaced in the interval. However, other forms of component value distributions inside the interval, such as Gaussian, Laplacian or biomodal, could instead be used or preferably be used as a complement to an equispaced distribution.

If the base value encoded by the base codeword instead represents the start or end point of the interval, equation 6 will be rewritten as presented in equation 7 (start point) or equation 8 (end point):

$$\text{component value} = M + \text{length} \times \left(0, \frac{1}{7}, \frac{2}{7}, \frac{3}{7}, \frac{4}{7}, \frac{5}{7}, \frac{6}{7}, 1\right) \quad (7)$$

$$\text{component value} = M + \text{length} \times \left(-1, -\frac{6}{7}, -\frac{5}{7}, -\frac{4}{7}, -\frac{3}{7}, -\frac{2}{7}, -\frac{1}{7}, 0\right) \quad (8)$$

The interval codewords present in Table I are not arbitrarily selected. Instead they are so-called prefix-free codes. This means that no codeword in Table I is a prefix to any other codeword in Table I. The usage of such prefix-free interval codewords simplifies decompression and identification of the interval codewords and the base codewords in the compressed block, which is described further below. Another example of such prefix-free codewords that can be used in Table I is the bitwise inversion of the disclosed codewords as illustrated in Table III below.

TABLE III

Interval codewords and codeword resolutions

| Width | $W_X/W_Y$ | $L(W_X)/L(W_Y)$ | $L(B_X)/L(B_Y)$ |
|---|---|---|---|
| ¹⁄₁₆ | 1 | 1 | 15 |
| ⅛ | 01 | 2 | 14 |
| ¼ | 001 | 3 | 13 |
| ½ | 0001 | 4 | 12 |
| 1 | 00001 | 5 | 11 |
| 2 | 000001 | 6 | 10 |
| 4 | 0000001 | 7 | 9 |
| 8 | 00000001 | 8 | 8 |

TABLE III-continued

Interval codewords and codeword resolutions

| Width | $W_X/W_Y$ | $L(W_X)/L(W_Y)$ | $L(B_X)/L(B_Y)$ |
|---|---|---|---|
| 16 | 000000001 | 9 | 7 |
| 32 | 0000000001 | 10 | 6 |
| 64 | 00000000001 | 11 | 5 |
| 128 | 000000000001 | 12 | 4 |
| 256 | 000000000000 | 12 | 4 |

The available interval lengths do not necessarily have to be factors of 2 or ½, resulting in a doubling of the interval lengths for each step. It could for example be possible to run a test on several image for providing statistics of the most usual interval widths in those images. These most frequent interval lengths could then replace the listed widths of Table I and III.

In Table I and III, the smaller the interval length the lower bit-resolution for the interval codeword. This in turn implies that the accuracy of positioning the interval, i.e. the resolution of the base codeword, is increased for shorter intervals. This will typically result in a good image quality for most images to be processed. However, for certain images the opposite could be true. In such a case, this can simply be solved by switching position of the interval length values of Table I and III so that the shortest interval codeword represents the largest interval and vice versa. In such a case, the precision in positioning the interval increases with interval lengths.

As was mentioned in the foregoing, tests can be run on different images in order to estimate the frequency of occurrence of different interval lengths in those images. The statistics can be used when designing tables as Table I and III. In such a case, the most frequent interval lengths are preferably assigned the shortest interval codeword lengths. This in turn means that the more bits can be spent on correctly positioning those most frequent intervals. As a consequence, the quality of the image processing will improve.

In such a case, the most usual interval width has the smallest corresponding interval codeword sizes. Table IV illustrates this principle. Note that in the table, the interval codeword size increases for less common interval lengths. In addition, up to a certain length, the codeword length does not increase further. This means the same codeword lengths is employed for several different interval widths. The reason for this is that otherwise the interval codewords associated with the least common widths would be very long, leaving few bits left to the base codeword.

TABLE IV

Interval codewords and codeword resolutions

| Width | $W_X/W_Y$ | $L(W_X)/L(W_Y)$ | $L(B_X)/L(B_Y)$ |
|---|---|---|---|
| Most frequent | 1 | 1 | 15 |
| 2$^{nd}$ most frequent | 01 | 2 | 14 |
| 3$^{rd}$ most frequent | 001 | 3 | 13 |
| 4$^{th}$ most frequent | 0001 | 4 | 12 |
| 5$^{th}$ most frequent | 00001 | 5 | 11 |
| Other interval widths | 000001000 | 9 | 7 |
| | 000001001 | 9 | 7 |
| | 000001010 | 9 | 7 |
| | 000001011 | 9 | 7 |
| | 000001100 | 9 | 7 |
| | 000001101 | 9 | 7 |
| | 000001110 | 9 | 7 |
| | 000001111 | 9 | 7 |

Once the interval codeword has been determined, the number of bits available for the base codeword can be determined as previously described. The base codeword determination typically involves identifying the smallest and largest vector components in the block. The average value of these components is then calculated to get the midpoint of the interval. The base codeword is determined based on this average value and the available bit resolution for the codeword, typically by selecting the N-bit value that is closest to the average value, where N=L(B). If the base value instead is the start or end point of the interval, the base codeword is determined by selecting the N-bit value that is closest to the smallest or largest component value in the block.

FIG. 7 is a flow diagram illustrating an embodiment of the index sequence determining step of FIG. 1 in more detail. The method continues from step S4. In a next step S30, a (X or Y) component index is provided for a current image element in the block. This component index is associated with a component value selected from the multiple component values encompassed by the interval represented by the interval codeword. For example, the component index is associated with one of the component values obtainable according to equation 6, 7 or 8. The selected component value is preferably the value that is equal to or closest to the original (X or Y) vector component of the image element. The step S30 is preferably repeated for all image elements in the image block, schematically illustrated by line L2.

In a first example embodiment, the X and Y index sequences contain the same number of bits for all image blocks. If eight different component values are available per image element, this means that the X and Y component indices comprises three bits. The X and Y index sequences then contain 16×3 bits each, as there are preferably 16 image elements in the block.

Having variable bit-resolutions also for the index sequences in addition to the base and interval codewords, could present problems if more than 3 bits would be required per component index. The total size of the compressed image block should be fixed and is preferably 128 bits. For example, in an implementation it could be advantageous to have 12 different levels for the component values instead of 8. If the image elements are to be processed independently this would amount to having component index resolutions of 4 bits. This in turn would result in a total of 128 bits spent for representing the X and Y index sequences, with no bits left for the base and interval codewords if the total compressed block size is limited to 128 bits.

The technology described in this application solves this problem by using a composite component index for a set of multiple image elements. FIG. 8 illustrates this procedure. The method continues from step S4 of FIG. 1. In a next step S40, a component value of the multiple available component values that best represents the vector component of an image element is selected. This is performed for all (16) image elements in the block as represented by the line L3.

In contrast to the situation of FIG. 7, the number of available component values could be different from different image blocks and also be more than eight. If the indices are encoded in sets of multiple indices, such as 3, fewer bits are required. We have the following possible combinations for the example with 12 different levels using a set of three image elements: $12 \times 12 \times 12 = 3 \times 3 \times 3 \times 4 \times 4 \times 4 = 27 \times 64 < 2^5 \times 2^6 = 2^{11}$. This means that only 11 bits are required for the set instead of 12 bits as would be needed if encoded separately. A look-up table could then be used for listing the possible component value combinations and the corresponding composite component indices as in Table V:

TABLE V composite component indices

| Component values | Composite component index |
|---|---|
| $v_0v_0v_0$ | 000 ... 00 |
| $v_0v_1v_0$ | 000 ... 01 |
| $v_1v_0v_0$ | 000 ... 10 |
| . | . |
| . | . |
| . | . |
| $v_{11}v_{11}v_{11}$ | 111 ... 11 |

In Table V $v_i$, i=0-11, represents a component value.

The composite index to use for the set of image elements is then identified from the look-up table based on the selected component values for the image elements of the set. This procedure is repeated for each set of image elements in the block, schematically represented by the line L4. The resulting composite indices, possible together with or a few odd "regular" component indices, together form the index sequence.

In the foregoing it has been described that a combined processing of both the X and Y vector components can be conducted. A first such example is to let the interval codewords $W_X$ and $W_Y$ (see FIGS. 3A to 3C) represent a radius and an angle in the X-Y-plane. The two base codewords $B_X$, $B_Y$ are determined as previously described and represent a respective X and Y base value in the X-Y-plane. These two values therefore form a point in the plane. The radius can then be positioned in the plane relative this point, for example by starting or ending in the point. The direction of the radius is defined by the angle, which could be an angle relative the X-axis or the Y-axis. Given the (X,Y) point, the radius and angle, it is possible to calculate the X interval and the Y interval, which each encompasses multiple X or Y component values.

In this combined encoding, the bit-resolution of the base codewords and the interval codeword ($W_X$) encoding the radius could be dynamically defined, whereas the interval codeword ($W_Y$) representing the angle could have a fixed bit-length.

In an alternative approach, the two base codewords represent base values as described above. A first interval codeword encodes a diagonal, while the second interval codeword is a representation of an X or Y interval. This second codeword could then represent a weight in the interval [0, 1]. This weight is, during decompression, multiplied by the diagonal length represented by the first interval codeword for giving a first (X or Y) interval length. The position of this first interval is defined by the two base values that could define, for instance, the start or end point of the interval. A second (Y or X) interval length can then be calculated from the first interval length and the diagonal using Phytagoras theorem ($l_2 = \sqrt{d^2 - l_1^2}$), where $l_1$, $l_2$ represent the first and second interval lengths and d is the diagonal.

The bit-resolution of the two base codewords and the interval codeword encoding the diagonal could then be dynamically defined, whereas the interval codeword encoding the weight could be of fixed bit-length. The compressed image block preferably also comprises an X/Y bit that is used for discriminating whether the interval obtainable by multiplying the diagonal with the weight is an X interval or a Y interval. In a preferred implementation of this embodiment, the difference between the largest and smallest X vector components and the difference between the largest and smallest Y vector components in the image block are compared. The X/Y bit is then defined based on that comparison. For example, if the distribution in original X vector components is smaller than the corresponding distribution of Y vector components, the X/Y bit is set so that the first interval calculable directly from the weight and the diagonal is the X interval, i.e. the component with smallest distribution. The larger Y interval is then calculable from the X interval and the diagonal.

The above teachings can be combined with the traditional 3Dc block processing. In such a case, 3Dc could be used for quickly moving normals, while the described technology above is used for slowly moving normals. In traditional 3Dc, the compressed block comprises two X codewords ($X_f$, $X_1$,) and two Y codewords ($Y_f$, $Y_1$) that represent the start and stop X and Y points of the X and Y intervals. In the following, the discussion is limited to only the X component, while the same discussion is also applicable to the Y component. In 3Dc, an image block is traditionally compliant both if $X_f \leq X_1$ and $X_f \geq X_1$. However, in the multi-mode embodiment, if $X_f < X_1$, the block is encoded using the 3Dc (default) mode. That means that it is processed the same way as a 3Dc block. However, if $X_f \geq X_1$, the block is processed according to the auxiliary mode.

Note that a 3Dc block can always be compressed in the default mode. If $X_f$ happens to be larger than $X_1$, the two codeword bit sequences can just be swapped and then $X_f < X_1$ holds. If $X_f = X_1$, the second codeword bit sequence can be set to $X_1 = X_f + 1$, and let all image element feature values be quantized according to the first codeword bit sequence. Alternatively, the first bit sequence can be set as $X_f = X_1 - 1$ and all image element values are quantized to the second codeword bit sequence. This means that all current 3Dc normal maps can be coded using only the default mode. The auxiliary mode therefore comes "for free" without any sacrifice of default payload bits.

At a first sight it may seem that there are limitations imposed on the actual values of the interval codewords and block codewords that can be used as $X_f \geq X_1$ and/or $Y_f \geq Y_1$. However, it is actually possible to use 15 of the total 16 bits of the two (X or Y) codeword bit sequences in 3Dc freely, i.e. without any limitations of the base and interval codeword values. The technique to use is described in detail in the documents [3] and [4]. The technique allows an exploitation of a maximum number of the 16 bits, while preserving $X_f \geq X_1$ and/or $Y_f \geq Y_1$. Basically, the following operations are used for getting the 15 bits that can be used in the auxiliary mode:

```
int get_15bits_back(X_f, X_1)
{
    if MSB(X_1 == 0)
        return (X_1 << 8) OR X_f;
    else
        return (NOT(X_1) << 8) OR NOT(X_f);
}
```

Note that it is possible to have up to three auxiliary modes in addition to 3Dc, depending on whether $X_f \geq X_1$ and $Y_f < Y_1$, $X_f < X_1$ and $Y_f \geq Y_1$ or $X_f \geq X_1$ and $Y_f \geq Y_1$. In the two first auxiliary modes 127 of the 128 bits can be set freely, while in the third case 126 bits can set freely.

In such an auxiliary mode, the base codeword represents a base value that could be the start point of the interval. The interval codeword represents the interval encompassing multiple component values in similarity to what has previously described. Table VI lists possible codes that can be used for the interval codeword, which codes have different bit-lengths and are so-called prefix-free codes.

TABLE VI

Interval codewords and codeword resolutions

| Width | Interval codeword | L(W) | L(B) | B representation |
|---|---|---|---|---|
| 1/16 | 00 | 2 | 13 | 8.5 |
| 1/16 + 1/32 | 01 | 2 | 13 | 8.5 |
| 1/8 | 100 | 3 | 12 | 8.4 |
| 1/8 + 1/16 | 101 | 3 | 12 | 8.4 |
| 1/4 | 1100 | 4 | 11 | 8.3 |
| 1/4 + 1/8 | 1101 | 4 | 11 | 8.3 |
| 1/2 | 11100 | 5 | 10 | 8.2 |
| 1/2 + 1/4 | 11101 | 5 | 10 | 8.2 |
| 1 | 11110 | 5 | 10 | 8.2 |
| 1 + 1/2 | 11111 | 5 | 10 | 8.2 |

In this Table VI, the base value will have both integer and fractional bits. Thus, eight bits are used for representing the integer part of the value whereas 2 to 5 (depending on the actual bit-resolution) bits represent the fractional parts. This means that the interval can be positioned with a very high accuracy.

Table VII is another example of a table with interval codewords and bit-resolutions for the codewords.

TABLE VII

Interval codewords and codeword resolutions

| Width | Interval codeword | L(W) | L(B) | B representation |
|---|---|---|---|---|
| 1/8 | 00 | 2 | 13 | 8.5 |
| 1/8 + 1/16 | 01 | 2 | 13 | 8.5 |
| 1/4 | 100 | 3 | 12 | 8.4 |
| 1/4 + 1/8 | 101 | 3 | 12 | 8.4 |
| 1/2 | 1100 | 4 | 11 | 8.3 |
| 1/2 + 1/4 | 1101 | 4 | 11 | 8.3 |
| 1 | 1110 | 4 | 11 | 8.3 |
| 1 + 1/2 | 1111 | 4 | 11 | 8.3 |

In Table VII the accuracy of the base value representation is four times compared to the minimum width of the interval W.

Table VIII is a further example of a table with interval codewords and bit-resolutions for the codewords.

TABLE VIII

Interval codewords and codeword resolutions

| Width | Interval codeword | L(W) | L(B) | B representation |
|---|---|---|---|---|
| 1/8 | 000 | 3 | 12 | 8.4 |
| 1/8 + 1/32 | 001 | 3 | 12 | 8.4 |
| 1/8 + 2/32 | 010 | 3 | 12 | 8.4 |
| 1/8 + 3/32 | 011 | 3 | 12 | 8.4 |
| 1/4 | 1000 | 4 | 11 | 8.3 |
| 1/4 + 1/16 | 1001 | 4 | 11 | 8.3 |
| 1/4 + 2/16 | 1010 | 4 | 11 | 8.3 |
| 1/4 + 3/16 | 1011 | 4 | 11 | 8.3 |
| 1/2 | 11000 | 5 | 10 | 8.2 |
| 1/2 + 1/8 | 11001 | 5 | 10 | 8.2 |
| 1/2 + 2/8 | 11010 | 5 | 10 | 8.2 |
| 1/2 + 3/8 | 11011 | 5 | 10 | 8.2 |
| 1 | 11100 | 5 | 10 | 8.2 |
| 1 + 1/4 | 11101 | 5 | 10 | 8.2 |
| 1 + 2/4 | 11110 | 5 | 10 | 8.2 |
| 1 + 3/4 | 11111 | 5 | 10 | 8.2 |

In Table VIII, four different interval widths are available on each level of accuracy of the base value.

Table IX is still another example.

TABLE IX

Interval codewords and codeword resolutions

| Width | Interval codeword | L(W) | L(B) | B representation |
|---|---|---|---|---|
| 1/4 | 000 | 3 | 12 | 8.4 |
| 1/4 + 1/16 | 001 | 3 | 12 | 8.4 |
| 1/4 + 2/16 | 010 | 3 | 12 | 8.4 |
| 1/4 + 3/16 | 011 | 3 | 12 | 8.4 |
| 1/2 | 1000 | 4 | 11 | 8.3 |
| 1/2 + 1/8 | 1001 | 4 | 11 | 8.3 |
| 1/2 + 2/8 | 1010 | 4 | 11 | 8.3 |
| 1/2 + 3/8 | 1011 | 4 | 11 | 8.3 |
| 1 | 1100 | 4 | 11 | 8.3 |
| 1 + 1/4 | 1101 | 4 | 11 | 8.3 |
| 1 + 2/4 | 1110 | 4 | 11 | 8.3 |
| 1 + 3/4 | 1111 | 4 | 11 | 8.3 |

Table IX has four times the accuracy in the base value compared to the minimum width of the interval.

Table X is a further example of a table that can be used.

TABLE X

Interval codewords and codeword resolutions

| Width | Interval codeword | L(W) | L(B) | B representation |
|---|---|---|---|---|
| 0.125 | 0000 | 4 | 11 | 8.3 |
| 0.250 | 0001 | 4 | 11 | 8.3 |
| 0.375 | 0010 | 4 | 11 | 8.3 |
| 0.500 | 0011 | 4 | 11 | 8.3 |
| 0.625 | 0100 | 4 | 11 | 8.3 |
| 0.750 | 0101 | 4 | 11 | 8.3 |
| 0.875 | 0110 | 4 | 11 | 8.3 |
| 1.00 | 0111 | 4 | 10 | 8.3 |
| 1.25 | 10000 | 5 | 10 | 8.2 |
| 1.50 | 10001 | 5 | 10 | 8.2 |
| 1.75 | 10010 | 5 | 10 | 8.2 |
| 2.00 | 10011 | 5 | 10 | 8.2 |
| 2.25 | 10100 | 5 | 10 | 8.2 |
| 2.50 | 10101 | 5 | 10 | 8.2 |
| 2.75 | 10110 | 5 | 10 | 8.2 |
| 3.00 | 10111 | 5 | 10 | 8.2 |
| 3.25 | 11000 | 5 | 10 | 8.2 |
| 3.50 | 11001 | 5 | 10 | 8.2 |
| 3.75 | 11010 | 5 | 10 | 8.2 |
| 4.00 | 11011 | 5 | 10 | 8.2 |
| 4.25 | 11100 | 5 | 10 | 8.2 |
| 4.50 | 11101 | 5 | 10 | 8.2 |
| 4.75 | 11110 | 5 | 10 | 8.2 |
| 5.00 | 11111 | 5 | 10 | 8.2 |

All the Tables VI to X above contain interval codewords representing rather short interval lengths. This means that if larger interval lengths would give a better result in terms of image quality, the default 3Dc mode will be selected. This in turn means that eight bits of the first (X or Y) codeword in the compressed block will be smaller than the following eight bits of the second (X or Y) codeword when interpreted as integers. However, if smaller interval lengths would give better quality result, the block is compressed, such as by using any of the above presented tables. In such a case, the first eight bits would be larger than the following eight bits when interpreted as integers.

Decompression

Figure 9:
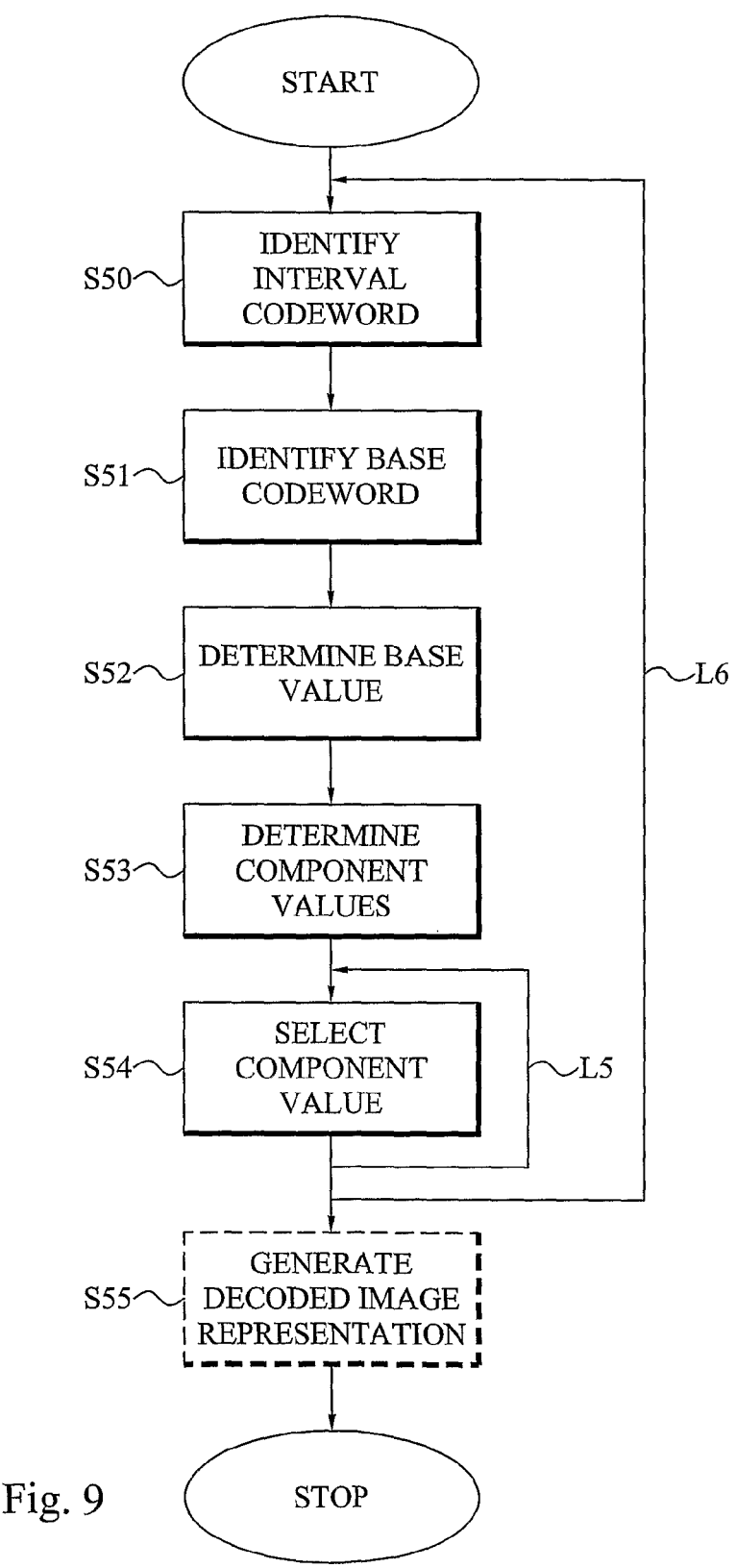
FIG. 9 is a flow diagram illustrating an image decompression method and an image block decompression method according to an embodiment.

FIG. 9 illustrates a flow diagram of a method of decompressing a compressed image. The compressed image basically comprises several compressed representations, of image blocks. These block representations are preferably generated by the image compressing method discussed above.

The method generally starts by identifying compressed image block(s) to decompress. It could be possible that all image blocks of a compressed image should be decompressed to generate a decompressed representation of the original image. Alternatively, only a portion of the original image is to be accessed. As a consequence, only a selected number of image blocks have to be decompressed (or more precisely, a selected number of image elements of certain image blocks have to be decoded).

In similarity to the block compression, the decompression can be performed separately for the two vector components, X and Y, in parallel or sequentially. This approach will first be described below. However, also a combined decompression could be possible in correspondence with the combined compression.

Once the correct compressed image block(s) is identified, one of the base codeword and the interval codeword is identified based on a bit pattern of at least a portion of the compressed representation. The other of the base codeword and the interval codeword is then determined based on the identified one of the base and interval codeword. In a preferred implementation, the interval codeword is first identified in step S50 based on a defined bit pattern of the compressed representation. This implementation utilizes the knowledge that the interval codewords are in the form of prefix-free codes. Once the interval codeword has been identified in the bit sequence that constitutes the compressed block, the corresponding base codeword for the current vector component (X or Y) can be identified. This identification is preferably conducted by assigning a set of bits following the identified interval codeword as the base codeword. The total number of bits in this set plus the number of bits in the interval codeword is preferably equal to a predefined maximum value. Thus, knowing this predefined value and determining the number of bits of the interval codeword in step S50, allows determination of how many of the following bits that together form the base codeword in step S51.

A next step S52 determines the base value based on the base codeword identified in step S51. If this base codeword comprises less than eight bits, such as five bits, the codeword is extended or expanded into eight bits. This can be realized by replicating the most significant bits of the codeword and adding them as least significant bits to form eight bits. If the base codeword comprises eight bits it can be used directly as base value. Correspondingly, if the base codeword comprises more then eight bits, the first eight bits preferably represent an integer value with the remaining bits as fractional value, for example in the form of 8.3.

The following step S53 determines the multiple component values based on the determined base value from step S52 and the interval codeword. Thus, the base value specifies where the interval should be positioned along the (X or Y) axis, for example by specifying the start, stop or mid point of the interval. The interval length to use is obtained from the interval codeword, such as by using the codeword as input to a function, predefined look-up table or set.

In a next step S54, a component value to use as representations of the original (X or Y) vector component of an image elements is selected based on the index sequence. In this step S54, the (X or Y) component index associated with the current image element is used to select a component value from the multiple (X or Y) component values calculated in step S53.

Step S54 could be performed for several image elements in the image block (schematically illustrated by line L5). It is anticipated that in some applications, only a single image element is decoded from a specific image block, multiple image elements of a specific image block are decoded and/or all the image elements of a specific block are decoded.

The procedure of step S50 to S54 can then be performed in a similar manner for the other vector component, or the two components can be processed in parallel, basically by performing each step S50 to S54 twice (one time for the first (X) vector component and one time for the second (Y) vector component).

Steps S50 to S54 are then preferably repeated for all image blocks that comprise image elements that should be decoded (schematically illustrated by line L6). This means that the loop of steps S50 to S54 could be performed once, but most often several times for different compressed image blocks and/or several times for a specific compressed image block. Note that the respective bit-resolutions (bit-lengths) of the interval codewords, base codewords and optionally index sequences may differ between different compressed image blocks to be processed according to FIG. 9.

In the optional step S55, a decompressed representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

FIG. 10 is a flow diagram illustrating an embodiment of the identifying steps of FIG. 9 in more detail. In this embodiment, the other of the base and interval codeword, preferably the base codeword, is identified based on a determined bit length of the identified one of the base and interval codeword, preferably the interval codeword.

The method starts in step S60, where a selected portion of the compressed representation is parsed until a predefined bit pattern is reached. This parsing of step S60 is preferably started from the beginning of the bit sequence constituting the compressed block for the first vector component and starting from the middle of the bit sequence for the second vector component. The parsing continues until the predefined bit pattern is reached. This embodiment is particularly adapted to the usage of prefix-free codes. In such a case, once a defined bit value of combination of multiple bits is identified, the preceding parsed portion of the bit sequence, and optionally a following portion of a predefined bit-length, constitutes one of the base and interval codeword, preferably the interval codeword. For example, if interval codewords as represented in Table I are used, the parsing through the compressed block is conducted until a first zero is reached or until twelve bits have been parsed. This parsed portion then constitutes the interval codeword. In Table IV, the parsed portion up to and including the first $1_{bin}$ constitutes the interval codeword unless the first $1_{bin}$ is preceded with five $0_{bin}$. In such a case, the parsed portion plus the following three bits constitute the interval codeword.

A next step S61 defines the interval codeword as the parsed portion (and optionally a following portion of predefined fixed length) of the compressed block. A portion of the compressed block following the identified interval codeword is defined in step S62 as the base codeword. The bit length of the interval codeword and the base codeword is fixed and equal to the predefined maximum value. The method then continues to step S52 of FIG. 9.

FIG. 11 is a flow diagram illustrating the component value determining step of FIG. 9 in more detail. The method continues from step S52 of FIG. 9. The next step S70 determines the (X or Y) interval length based on the interval codeword. This determination can be performed by calculating the length directly from the codeword. In an alternative approach, the codeword is used as input to a function, look-up table, etc. to give the corresponding interval length. The multiple component values are calculated based on this interval length and the base value.

In a preferred implementation, the method continues to step S71 where the start point of the interval is determined. This determination can be performed using only the base value if the base value represents the interval start point. Otherwise the determination is conducted using both the base value and the interval length. A corresponding step S72 determines the stop point of the interval using the base value or the base value and interval length. The multiple compressed values are preferably calculated as linear combinations of the start and stop points in step S73:

$$X_i = X_{min} + i \times \frac{X_{max} - X_{min}}{N_X - 1} \quad (9)$$

where $X_i$ denotes a X component value, $X_{min}$ is the interval start point, $X_{max}$ is the interval stop point, $N_X$ is the number of X component values and $i=0, 1, \ldots N_X-1$, $N_X$ is preferably eight. The start and stop points can be calculated according to any of equations 10 to 12 depending on whether the X base value is the start, mid or stop point of the interval:

$$X_{min}=B_X$$

$$X_{max}=B_X+W_X \quad (10)$$

$$X_{min}=B_X-0.5W_X$$

$$X_{max}=B_X+0.5 \times W_X \quad (11)$$

$$X_{min}=B_X-W_X$$

$$X_{max}=B_X \quad (12)$$

The method then continues to step S54 of FIG. 9.

Figure 12A:
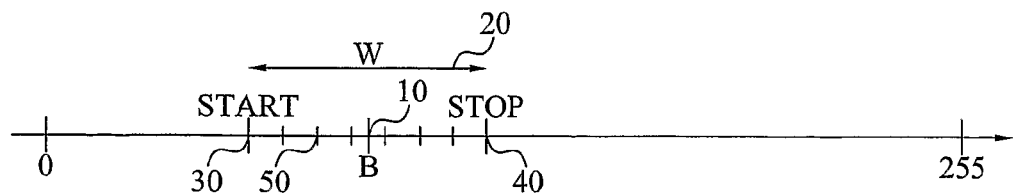
FIGS. 12A to 12C are diagrams illustrating calculation of component values for a first vector component.
Figure 12B:
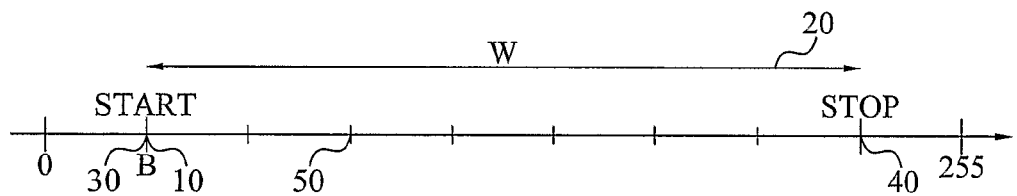
Figure 12C:
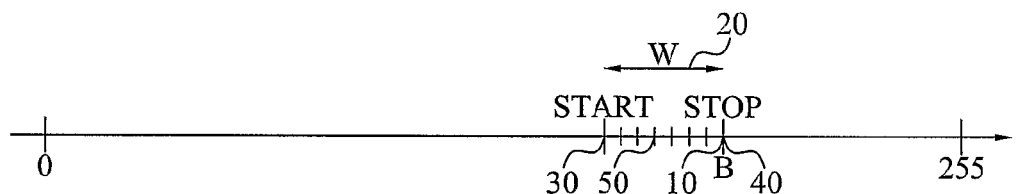

FIGS. 12A to 12C are diagrams illustrating the concept of different component values 50 inside an interval 20 defined by the interval codeword. In FIG. 12A, the base value 10 represents the mid point of the interval 20. The start 30 and stop 40 points of the interval can be calculated from the base value 10 and the interval length 20 using equation 11 above. The eight component values 50 are obtained from the end points 30, 40 by means of equation 9 above. It should though be noted that the component values can of course be calculated directly from the base value 10 and the interval length 20 without first calculating the end points 30, 40, see for example equation 6.

In FIG. 12B, the interval length 20 is comparatively larger than in FIG. 12A. In addition, the base value 10 is here the start point 30 of the interval. The end point 40 is obtainable from equation 10. As the interval 20 is relatively large now, the distances between the component values 50 also increase as compared to FIG. 12A. FIG. 12C illustrates a diagram with a small interval length 20 and where the base value 10 represents the end point 40 of the interval 20.

A combined decoding of the two vector components can be performed. For example, the two interval codewords could represent an angle and a radius. In such a case, the compressed block is preferably parsed for finding the radius-encoding interval codeword. This in turn allows identification of the two base codewords. In a preferred implementation of this embodiment, the X and Y base codewords have the same bit resolutions. In addition, the angle-encoding interval codeword has a fixed length. The X interval length can be determined as $r \times cos(\theta)$ and the Y interval length is $r \times sin(\theta)$, where r is the radius represented by the first interval codeword and $\theta$ is the angle represented by the second codeword. The different X and Y component values are calculated from the X and Y interval lengths and the X and Y base values as described above.

Figure 12D:
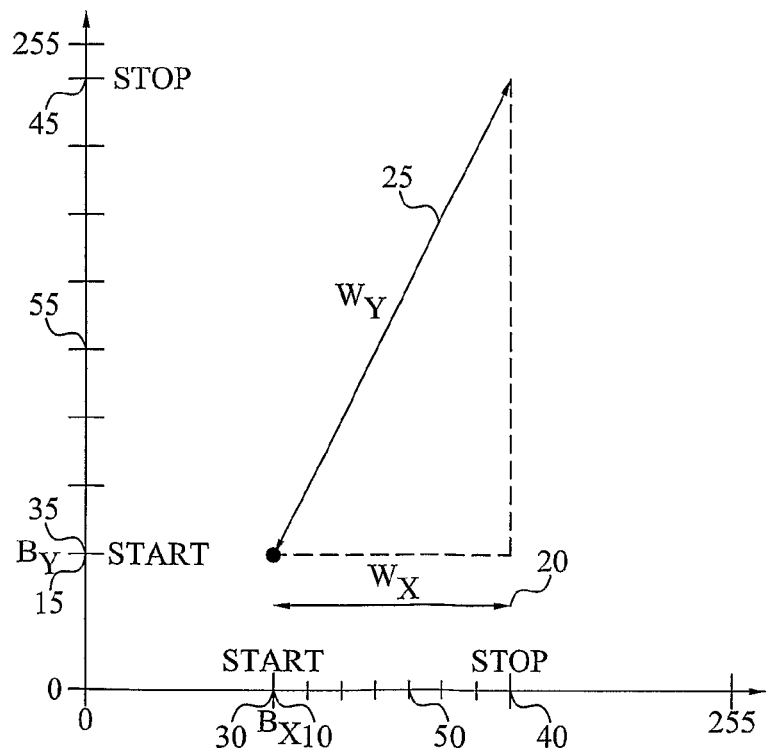
FIG. 12D is diagrams illustrating calculation of component values for the first and second vector components.

FIG. 12D illustrates another combined decompression, where the one of interval codewords represents a diagonal 25 and the other represents a weight that is used together with the diagonal 25 to calculate an interval length 20. An X/Y bit decides whether the interval length 20 should be an X or Y interval. The other interval is calculated from the diagonal 25 and the first interval 20. The base values 10, 15 give the positions of the two calculated intervals 20. In FIG. 12D, the start 35 and stop 45 points of the Y interval and Y component values 55 are illustrated in addition to the corresponding X points 30, 40 and values 50.

DECOMPRESSION EXAMPLE

Herein follows decompression examples using a bit sequence layout as illustrated in FIGS. 3A to 3C.

The compressed image block is represented by the following bit sequence:
1100110011110100 110 001 . . . 001
1111111101011001 101 110 . . . 010

Table I is here used for providing different interval codewords. Starting with the X vector component, the first 64 bits of the compressed block is parsed from the beginning towards the end in order to find the X interval codeword. The parsing is ended in this case once the first zero is reached. This zero and the preceding bits, i.e. $110_{bin}$, constitute the X interval codeword. In Table I that codeword corresponds to an interval width of ¼.

The following $16-L(W_X)=13$ bits form the base codeword. The first eight bits are integer bits, while the remaining 5 form fractional bits:

$$\text{Integer:}01100111_{bin}=103$$

$$\text{Fractional:}10100_{bin}=½+⅛=0.625$$

The X base value is thus 103.625 and the X interval length is 0.25.

The same procedure is conducted for the Y component, where the last 64 bits are first parsed starting from $64^{th}$ bit. In this case, the Y interval codeword is $111111110_{bin}$, which corresponds to an interval length of $2^4=16$ according to Table I. The following $16-L(W_Y)=7$ bits form the Y base codeword. The codeword is first expanded into eight bits before the Y base value can be calculated:

$$101001_{bin} \rightarrow 10110011_{bin}=179$$

The Y base value is thus 179 and the Y interval length is 16.

In this illustrative example, the base values represent the mid points of the intervals. Equation 6 above gives the possible X and Y component values:

$$Value_X = 103.625 + 0.25 \times \left(-\frac{7}{14}, -\frac{5}{14}, -\frac{3}{14}, -\frac{1}{14}, \frac{1}{14}, \frac{3}{14}, \frac{5}{14}, \frac{7}{14}\right)$$

$$Value_Y = 179 + 16 \times \left(-\frac{7}{14}, -\frac{5}{14}, -\frac{3}{14}, -\frac{1}{14}, \frac{1}{14}, \frac{3}{14}, \frac{5}{14}, \frac{7}{14}\right)$$

$$Value_X =$$
(103.5, 103.536, 103.571, 103.607, 103.643, 103.679, 103.714, 103.75)

-continued $$Value_Y = (171, 173.286, 175.571, 177.857,$$
$$180.143, 182.429, 184.714, 187)$$

The first image element has X component index $110_{bin}$ and Y component index $101_{bin}$. This means that the X component value 103.714 and Y component value 182.429 should be selected. If a remapping into the interval [−1,1] is used these values become: 2×103.714/255−1=−0.187 and 2×182.429/255−1=0.431. The Z-coordinate representation for the image element is then calculated, using equation 1, from these two remapped values: $\sqrt{1-(-0.187)^2-(0.431)^2}=0.470$. Thus, the final normal for the first image element is (X, Y, Z)=(−0.187, 0.431, 0.470).

The second image element has X index $001_{bin}$, which corresponds to X component value 103.536, and Y index $110_{bin}$, which is associated with the value 184.714. After remapping, the values are −0.188 and 0.449. The Z coordinate becomes: 0.487. The normal for the second image element is (X, Y, Z)=(−0.188, 0.449, 0.487). This procedure is then continued with the remaining image elements in the block that should be decoded.

Implementation Aspects

The image (block) compression and image (block) decompression scheme could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

FIG. 13 illustrates a user terminal 100 represented by a mobile unit. However, the technology is not limited to mobile units but could be implemented in other terminals and data processing units, such as PC computers and game consoles. Only means and elements in the mobile unit 100 of interest are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular compressed image data.

An image compressor 210 is typically provided in the mobile unit 100. This compressor 210 is configured for compressing an image or texture into a compressed representation of the image. As was discussed above, such a compressed representation comprises a sequence or file of multiple compressed image blocks. This image compressor 210 may be provided as software running on the CPU 200, as is illustrated in the figure. Alternatively, or in addition, the compressor 210 could be arranged in the graphic system 130 or elsewhere in the mobile unit 100.

A compressed representation of an image from the block compressor 210 may be provided to the memory 140 over a (memory) bus 150, for storage therein until a subsequent rendering of the image. Alternatively, or in addition, the compressed image data may be forwarded to an input and output (I/O) unit 110 for (wireless or wired) transmission to other external terminals or units. The I/O unit 110 could, for instance, represent the transmitter and receiver chain of the user terminal. The I/O unit 110 can also be adapted for receiving image data from an external unit. This image data could be an image that should be compressed by the image compressor 210 or compressed image data that should be decompressed. It could also be possible to store the compressed image representation in a dedicated texture memory provided, for example, in the graphic system 130. Furthermore, portions of the compressed image could also, or alternatively, be (temporarily) stored in a texture cache memory, e.g. in the graphic system 130.

An image decompressor 220 is typically provided in the mobile unit 100 for decompressing a compressed image in order to generate a decompressed image representation. This decompressed representation could correspond to the whole original image or a portion thereof. The image decompressor 220 provides decompressed image data to the graphic system 130, which in turn typically processes the data before it is rendered or presented on the screen 120. The image decompressor 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image compressor 210 and an image decompressor 220, as is illustrated in the figure. However, for some terminals 100 it could be possible to only include an image compressor 210. In such a case, compressed image data could be transmitted to another terminal that performs the decompression and, possibly, rendering of the image. Correspondingly, a terminal 100 could only include an image decompressor 220, i.e. no compressor. Such a terminal 100 then receives a signal comprising compressed image data from another entity and decompresses it to generate a decompressed image representation. Thus, the compressed image signal could be wirelessly be transmitted between terminals using radio transmitter and receiver. Alternatively, other techniques for distributing images and compressed image representations between terminals could be employed, such as BLUETOOTH®, IR-techniques using IR ports and wired transferring of image data between terminals. Also memory cards or chips, including USB memory, that can be connected and exchanged between terminals could be used for this image data inter-terminal distribution.

The units 110, 130, 200, 210 and 220 of the mobile unit 100 may be provided as software, hardware or a combination thereof.

Image Encoder

FIG. 14 illustrates a block diagram of an example embodiment of an image compressor 210. The compressor 210 typically comprises an image decomposer 215 for decomposing or dividing an input image into several image blocks. The decomposer 215 is preferably configured for decomposing the image into image blocks comprising sixteen image elements (pixels, texels or voxels), i.e. having a general size of 4×4 image elements. This decomposer 215 could be adapted for decomposing different input images into image blocks with different sizes. In such a case, the decomposer 215 preferably receives input information, enabling identification of which image block format to use for a given image.

This embodiment of the image compressor 210 comprises a block compressor 300. This block compressor 300 compresses the image block(s) received from the image decomposer to generate compressed block representation(s). The overall size of the block representation is smaller than the corresponding size of the uncoded image block. The block compressor 300 is preferably configured for processing (encoding) each image block from the decomposer 215 sequentially.

In an alternative implementation, the compressor 210 includes multiple block compressor 300 for processing multiple image blocks from the image decomposer 215 in parallel, which reduces the total image encoding time.

The units 215 and 300 of the image compressor 210 may be provided as software, hardware or a combination thereof. The units 215 and 300 may be implemented together in the image compressor 210. Alternatively, a distributed implementation is also possible with some of the units provided elsewhere in the mobile unit.

Block Encoder

FIG. 15 illustrates a block diagram of an example embodiment of a block compressor 300, such as the block compressor of the image compressor in FIG. 14. The compressor 300 comprises a resolution definer 310 arranged for defining a respective bit resolution for at least two of an (X or Y) base codeword, an (X or Y) interval codeword and an (X or Y) index sequence. The definer 310 receives the original X and Y vector components of the image block to be compressed and performs the bit resolution definition based on at least a portion of the components. A base quantizer 320 is arranged for determining the (X or Y) base codeword as a representation of a (X or Y) base value. This codeword determination is performed based on at least a portion of the (X or Y) vector components and also preferably based on the bit resolution, i.e. codeword length in terms of bits, defined by the resolution definer 320. A corresponding interval quantizer 330 is arranged in the block encoder 300 for determining the (X or Y) interval codeword as a representation of an (X or Y) interval encompassing multiple (X or Y) component values relative the (X or Y) base value. The quantizer 330 performs this codeword determination based on at least a portion of the (X or Y) vector components and preferably based on the bit resolution assigned to the codeword by the definer 310. The compressor 300 also comprises an index quantizer 340. This quantizer 340 is arranged for determining the (X or Y) index sequence indicative of, for each image element in the block, a (X or Y) component value selected from the (X or Y) values encompassed by the (X or Y) interval. The index quantizer 340 preferably identifies the (X or Y) component value of the multiple (X or Y) values that best represents the (X or Y) vector component of an image element in the block. This identification is preferably conducted by means of an error estimator 350 arranged in the encoder. A (X or Y) component index associated with the identified component value is then provided by index quantizer 340. The error estimator 350 is implemented to estimate, for each (X or Y) component value of the multiple available (X or Y) values, an error estimate indicative of representing the (X or Y) vector component of an image element with that (X or Y) component value. Thus, the provided (X or Y) component index allows identification of the (X or Y) component value that best represents, i.e. is associated with smallest error, the original (X or Y) vector component of that image element's feature vector. The different (X or Y) component indices together form the (X or Y) index sequence.

The block compressor 300 preferably also comprises a component identifier 360 that is arranged for identifying the largest (X or Y) vector component and the smallest (X or Y) vector component in the image block. This information can be of used by the resolution definer 310, the base quantizer 320 and the interval quantizer 330. For example, the interval quantizer 330 can be arranged for determining the (X or Y) interval codeword as a representation of the difference between the largest and smallest (X or Y) vector components.

The quantizer 330 preferably uses the difference as input to a function, predefined set or, as illustrated in the figure, a look-up table 370 comprising multiple predefined (X or Y) interval codewords. Thus, the quantizer 330 selects the (X or Y) codeword associated with an interval length that is closest to the difference between the largest and smallest (X and Y) component values. At least some of codewords in the table 370 have different bit lengths to provide the dynamic and variable bit resolution.

The base quantizer 320 preferably determines the (X or Y) base codeword as the start point, middle point or end point of the interval represented by the (X or Y) interval codeword. In the case of start point, the base quantizer 320 uses information of the smallest (X or Y) value from the component identifier 360 and generates the (X or Y) base codeword as a representation of that smallest value. Correspondingly, if the (X or Y) value is the end point, the base quantizer 320 uses information of the largest (X or Y) value. Both (X or Y) values are employed by the quantizer 320 if the (X or Y) base value is to become the middle point of the interval.

The resolution definer 310 preferably defines the respective bit resolutions based on a distribution of the (X or Y) vector components. This distribution is determined based on the largest and smallest (X or Y) components from the identifier 360. The definer 310 could, for instance, define the bit resolutions based on a difference of the largest and smallest (X or Y) vector components.

The units 310 to 360 of the block compressor 300 may be provided as software, hardware or a combination thereof. The units 310 to 370 may be implemented together in the block compressor 300. Alternatively, a distributed implementation is also possible with some of the units provided elsewhere in the image compressor.

FIG. 16 is a schematic block diagram of an embodiment of the resolution definer 310 of FIG. 15 in more detail. This definer 310 is arranged for defining the bit resolution for the (X or Y) interval codeword based on at least a portion of the (X or Y) vector components, preferably based on the largest and smallest (X or Y) vector components. A resolution calculator 312 is implemented in the definer 310 for calculating the corresponding bit resolution of the (X or Y) base codeword from this interval codeword resolution and a predefined maximum resolution value.

The unit 312 of the resolution definer 310 may be provided as software, hardware or a combination thereof. The unit 312 may alternatively be implemented elsewhere in the block compressor.

FIG. 17 is a schematic block diagram of an embodiment of the index quantizer 330 of FIG. 15 in more detail. The quantizer 330 comprises a value selector 332 arranged for selecting, for each image element in the block, a (X or Y) component value of the multiple (X or Y) values encompassed in the (X or Y) interval. This selected (X or Y) value gives the smallest error of the available values. An index identifier 334 then identifies a composite (X or Y) component index for a set of multiple image elements based on the (X or Y) component values selected by the selector 332. This means that one (X or Y) index is used collectively for several image elements. The identifier 334 preferably has access to a look-up table 336 comprising multiple such component indices. The identifier 334 therefore selects the most suitable composite index from this table 336. The resulting (X or Y) index sequence will in this embodiment comprise at least one such composite index and optionally also at least one traditional (X or Y) component index that is assigned only for a single image element.

The units 332 and 334 of the index quantizer 330 may be provided as software, hardware or a combination thereof. The units 332, 334 and 336 may alternatively be implemented elsewhere in the block compressor.

Image Decoder

FIG. 18 illustrates a block diagram of an example embodiment of an image decompressor 220. The image decompressor 220 preferably comprises a block selector 222 that is adapted for selecting, e.g. from a memory, which encoded image block(s) that should be provided to a block decompressor 400 for decompression. The block selector 222 preferably receives input information associated with the compressed image data, e.g. from a header or a rendering engine. An address of a compressed image block having the desired image element(s) is then computed based on the input information. This computed address is preferably dependent upon the image-element (pixel, texel or voxel) coordinates within an image. Using the address, the block selector 222 identifies the compressed image block from the memory. This identified compressed image block is then fetched from the storage and provided to the block decompressor 400.

The (random) access to image elements of an image block advantageously enables selective decompression of only those portions of an image that are needed. Furthermore, the image can be decompressed in any order the data is required. For example, in texture mapping only portions of the texture may be required and these portions will generally be required in a non-sequential order. Thus, the image decompression can with advantage by applied to process only a portion or section of an image.

The selected compressed image block is then forwarded to the block decompressor 400. In addition to the image block, the decompressor 400 preferably receives information specifying which image elements of the block that should be decoded. The information could specify that the whole image block, i.e. all image elements therein, should be decoded. However, the received information could identify only a single or a few of the image elements that should be decoded. The block decompressor 400 then generates a decompressed representation of the image element(s) in the block.

An optional image composer 224 could be provided in the image decompressor 220. This composer receives the decoded image elements from the block decompressor 400 and composes them to generate a pixel that can be rendered or displayed on a screen. This image composer 224 could alternatively be provided in the graphic system.

Alternatively, the image decompressor 220 comprises multiple block decompressors 400. By having access to multiple block decompressors 400, the image decoder 220 can process multiple encoded image blocks in parallel. These multiple block decompressors 400 allow for parallel processing that increases the processing performance and efficiency of the image decompressor 220.

The units 222, 224 and 400 of the image decompressor 220 may be provided as software, hardware or a combination thereof. The units 222, 224 and 400 may be implemented together in the image decompressor 220. Alternatively, a distributed implementation is also possible with some of the units provided elsewhere in the user terminal.

Block Decoder

FIG. 19 is an illustration of an example embodiment of a block decompressor 400. The block decompressor 400 comprises a codeword identifier 410 arranged for identifying one of the (X or Y) base codeword and the (X or Y) interval codeword based on a bit pattern of at least a portion of the compressed block. The identifier 410 also identifies the other of the (X or Y) base and interval codewords based on the first identified (X or Y) codeword. In a preferred implementation, once the identifier 410 has identified the first of the (X or Y) base and interval codewords, it determines the bit length of that codeword. Given this length and a predefined maximum value, the identifier 410 can locate the other of the (X or Y) base and interval codewords as a following portion in the compressed block.

The base value generator 420 uses the identified (X or Y) base codeword for determining a (X or Y) base value as previously described. A component value generator 430 uses the determined (X or Y) base value and the identified (X or Y) interval codeword as input for the generation of multiple (X or Y) component values. The block decompressor 400 also comprises a value selector 440 that uses the (X or Y) index sequence for selecting, for at least one image element, a (X or Y) component value from the generated component values. In a typical approach the selector 440 identifies the (X or Y) component index associated with the current image element for selecting one of the component values. In the case of a composite index, the selector 440 can collectively select (X or Y) component values for multiple image elements simultaneously. This selection is preferably performed using a look-up table 450, such as Table V above.

The units 410 to 440 of the block decompressor 400 may be provided as software, hardware or a combination thereof. The units 410 to 450 may be implemented together in the block decompressor 400. Alternatively, a distributed implementation is also possible with some of the units provided elsewhere in the image decompressor.

FIG. 20 is a schematic block diagram of an embodiment of the codeword identifier 410 of FIG. 19 in more detail. The codeword identifier 410 comprises a bit parser 412 arranged for parsing through a selected portion of the compressed block until a predefined bit pattern is reached. The parser typically starts the parsing from the beginning of the compressed block for the first (X) vector component and from the middle of the block for the second (Y) component, see FIGS. 3A to 3C. This bit pattern could be a first $0_{bin}$ or $1_{bin}$ or a first combination of zeros or ones. Furthermore, the bit pattern could be a section of the compressed block having a maximum length. A codeword definer 414 of the identifier 410 is arranged for defining the parsed portion up to, and preferably including the predefined bit pattern, of the compressed block as one of the (X or Y) base codeword and (X or Y) interval codeword, preferably the (X or Y) interval codeword. The definer 414 also defines a following portion of the compressed block as the other of the (X or Y) base codeword and (X or Y) interval codeword, preferably the (X or Y) base codeword. The bit length of the portion identified as the (X or Y) interval codeword and the portion identified as the (X or Y) base codeword is fixed for all image blocks and equals a predefined maximum value.

The units 412 and 414 of the codeword identifier 410 may be provided as software, hardware or a combination thereof. The units 412 and 414 may alternatively be implemented elsewhere in the block decompressor.

FIG. 21 is a schematic block diagram of an embodiment of the component value generator 430 of FIG. 19 in more detail. The value generator 430 comprises an interval generator 432 arranged for determining a length of an (X or Y) interval based on the interval codeword. This interval length can be calculated directly from the codeword. In an alternative approach, the generator 432 utilizes a function or look-up table arranged in the value generator 430 or provided elsewhere in the block decoder (see table 450 of FIG. 19). A value calculator 434 of the value generator 430 is arranged for calculating the multiple (X or Y) component values based on the (X or Y) interval length from the interval generator 432 and the (X or Y) base value from the base value generator.

In a preferred implementation, the value generator 430 also comprises a start point generator 436 and a stop point generator 438. These generators 436, 438 calculates the start and stop point of the (X or Y) interval using the interval length and base value. The value calculator 434 can use this information of the two end points for calculating the multiple (X or Y) component values, typically as linear combinations of the start point and stop point.

In the foregoing, the technology has been described with reference of processing image blocks having normals, preferably normalized surface normals, as feature vectors. In an alternative implementation, the feature vectors could be a color vector in a color space, such as RGB (red, green, blue) space. In such a case, the compressed image block comprises one base codeword representing a base color in the color space, e.g. an RGB point. The interval codeword could then represent a vector in color space in relation to the base color, i.e. defining both an interval length and direction. The base color and the vector will together define an interval in color space having a start point and an end point. This interval encompasses multiple color values that are preferably obtainable as linear combinations of the two interval end points. The compressed block also comprises an index sequence, having a color index per image element, where the color indices are each associated with one of the multiple color values. The bit resolution for the interval codeword and the base codeword can be adapted and varied, though the total bit length of the compressed block remains the same. For example, if the interval length is large, the interval codeword can have a relatively long bit length, leaving fewer bits left for the base codeword. However, for a short interval length, correspondingly more bits are spent on the base codeword with fewer bits for the interval codeword.

The interval codeword can include two parts, for example, an angle representing part and a radius representing part. In such a case, the number of bits spent on the angle representing part could be fixed, whereas the bit length of the radius representing part can be adjusted depending on the distribution of the original color vectors of the image elements in the color space.

It will be understood by a person skilled in the art that various modifications and changes may be made without departure from the scope of the appended claims.

References

[1] http://www.ati.com/products/radeonx800/3DcWhitePaper.pdf ATI™ Radeon™ X800 3Dc™ White Paper
[2] U.S. Pat. No. 5,956,431
[3] Munkberg et al., "High quality normal map compression", *Graphics Hardware* September 2006
[4] PCT/SE2007/000053

The invention claimed is:

1. A method of compressing an image block of multiple image elements having a respective feature vector representing a feature associated with said image elements, said method comprising the steps of:
defining a bit resolution for an interval codeword based on at least a portion of vector components of feature vectors;
calculating a bit resolution for a base codeword as a difference between a predefined maximum resolution value and said bit resolution defined for said interval codeword;
determining said base codeword as a representation of a base value based on at least a portion of said vector components;
determining said interval codeword as a representation of an interval encompassing multiple component values relative said base value based on at least a portion of said vector components; and
determining an index sequence indicative of, for each image element of said multiple image elements, a component value selected from said multiple component values.

2. The method according to claim 1, wherein said defining step comprises defining said respective bit resolutions based on a distribution of said vector components of said feature vectors.

3. The method according to claim 1, wherein said defining step comprises the steps of:
identifying a largest vector component of said feature vectors;
identifying a smallest vector component of said feature vectors; and
defining said respective bit resolutions based on a comparison of said largest vector component and said smallest vector component.

4. The method according to claim 1, wherein said step of determining said interval codeword comprises determining said interval codeword as a representation of said interval based on at least a portion of said vector components and the bit resolution defined for said interval codeword.

5. The method according to claim 1, wherein said step of determining said interval codeword comprises the steps of:
identifying a largest vector component of said feature vectors;
identifying a smallest vector component of said feature vectors; and
determining said interval codeword as a representation of a difference between said largest vector component and said smallest vector component.

6. The method according to claim 5, wherein said step of determining said interval codeword comprises identifying, based on said difference between said largest vector component and said smallest vector component, said interval codeword from a set of multiple predefined interval codewords.

7. The method according to claim 6, wherein each of said multiple predefined interval codewords has a predefined bit resolution and a bit resolution of a first interval codeword of said multiple predefined interval codewords is different from a bit resolution of a second interval codeword of said multiple predefined interval codewords.

8. The method according to claim 1, wherein said step of determining said base codeword comprises determining said base codeword as a representation of said base value based on at least a portion of said vector components and the bit resolution defined for said base codeword.

9. The method according to claim 1, wherein said step of determining said base codeword comprises determining said base codeword as at least one of a start point, middle point and end point of said interval based on said at least a portion of said vector components and said bit resolution defined for said base codeword.

10. The method according to claim 1, wherein said step of determining said index sequence comprises determining said index sequence, based on the bit resolution defined for said index sequence, indicative of, for each image element of said multiple image elements, a component value selected from said multiple component values.

11. The method according to claim 1, wherein said step of determining said index sequence comprises providing, for each image element of said multiple image elements, a component index indicative of a component value selected from said multiple component values.

12. The method according to claim 1, wherein said step of determining said index sequence comprises the steps of:
   selecting, for each image element of said multiple image elements, a component value of said multiple component values that best represents the vector component of said image element; and
   identifying a composite component index for a set of multiple image elements in a look-up table based on said selected component values for said image elements of said set.

13. A method of processing a compressed representation of an image block comprising multiple image elements, said compressed representation comprises a base codeword, an interval codeword, and an index sequence, said method comprising the steps of:
   parsing through said compressed representation until a predefined bit pattern is reached;
   defining one of said base codeword and said interval codeword based on said parsed portion of said compressed representation;
   defining a following portion of said compressed representation as the other of said base codeword and said interval codeword, wherein a bit length of said interval codeword and said base codeword is fixed;
   determining a base value based on said base codeword;
   determining multiple component values based on said base value and said interval codeword; and
   for at least one image element in said image block:
   selecting, based on said index sequence, a component value from said multiple component values.

14. The method according to claim 13, wherein said step of identifying the other of said base codeword and said interval codeword comprises identifying the other of said base codeword and said interval codeword in said compressed representation based on a determined bit length of said identified one of said base codeword and said interval codeword.

15. The method according to claim 13, wherein said step of determining said multiple component values comprises the steps of:
   determining a length of an interval based on said interval codeword; and
   calculating said multiple component values based on said interval length and said base value.

16. The method according to claim 15, wherein said calculating step comprises the steps of:
   determining a start point of said interval based on said interval length and said base value;
   determining a stop point of said interval based on said interval length and said base value;
   calculating said multiple component values based on said start point and said stop point.

17. The method according to claim 16, wherein said calculating step comprises calculating said multiple component values as linear combinations of said start point and said stop point.

18. A block compressor for compressing an image block comprising multiple image elements having a respective feature vector representing a feature associated with said image elements, said block compressor comprising:
   resolution definer circuitry arranged to define a bit resolution of an interval codeword based on at least a portion of vector components of feature vectors;
   resolution calculator circuitry arranged to calculate a bit resolution for a base codeword as a difference between a predefined maximum resolution value and said bit resolution defined for said interval codeword;
   base quantizer circuitry arranged to determine said base codeword as a representation of a base value based on at least a portion of said vector components;
   interval quantizer circuitry arranged to determine said interval codeword as a representation of an interval encompassing multiple component values relative said base value based on at least a portion of said vector components;
   index quantizer circuitry arranged to determine said index sequence indicative of, for each image element of said multiple image elements, a component value selected from said multiple component values.

19. The block compressor according to claim 18, wherein said resolution definer circuitry is arranged to define said respective bit resolutions based on a distribution of said vector components of said feature vectors.

20. The block compressor according to claim 18, further comprising component identifier circuitry arranged to i) identify a largest vector component of said feature vectors, and ii) identify a smallest vector component of said feature vectors, wherein said resolution definer circuitry is arranged to define said respective bit resolutions based on a comparison of said largest vector component and said smallest vector component identified by said component identifier.

21. The block compressor according to claim 18, wherein said interval quantizer circuitry is arranged to determine said interval codeword as a representation of an interval encompassing multiple component values relative said base value based on at least a portion of said vector components and the bit resolution defined for said interval codeword by said resolution definer.

22. The block compressor according to claim 18, further comprising component identifier circuitry arranged to i) identify a largest vector component of said feature vectors, and ii) identify a smallest vector component of said feature vectors, wherein said interval quantizer is arranged for determining said interval codeword as a representation of a difference between said largest vector component and said smallest vector component identified by said component identifier.

23. The block compressor according to claim 18, wherein said base quantizer circuitry is arranged to determine said base codeword as a representation of said base value based on at least a portion of said vector components and the bit resolution defined for said base codeword by said resolution definer.

24. The block compressor according to claim 18, wherein said base quantizer circuitry is arranged to determine said base codeword as at least one of a start point, middle point and end point of said interval based on said at least a portion of said vector components and said bit resolution defined for said base codeword.

25. The block compressor according to claim 18, wherein said index quantizer circuitry is arranged to determine said index sequence, based on the bit resolution defined for said index sequence by said resolution definer, indicative of, for each image element of said multiple image elements, a component value selected from said multiple component values.

26. The block compressor according to claim 18, wherein said index quantizer circuitry is arranged to provide, for each image element of said multiple image elements, a component index indicative of a component value selected from said multiple component values.

27. The block compressor according to claim 18, wherein said index quantizer circuitry comprises:

a value selector arranged to select, for each image element of said multiple image elements, a component value of said multiple component values that best represents the vector component of said image element; and an index identifier arranged to identify a composite component index for a set of multiple image elements in a look-up table based on said component values for said image elements of said set selected by said value selector.

28. A block decompressor for processing a compressed representation of an image block comprising multiple image elements, said compressed representation comprises a base codeword, an interval codeword, and an index sequence, said block decompressor comprising electronic circuitry including:

a bit parser arranged to parse through said compressed representation until a predefined bit pattern is reached;

a codeword definer arranged to i) define said one of said base codeword and said interval codeword based on said parsed portion of said compressed representation, and ii) define a following portion of said compressed representation as said other of said base codeword and said interval codeword, wherein a bit length of said interval codeword and said base codeword is fixed;

a base value generator arranged to determine a base value based on said base codeword;

a component value generator arranged to determine multiple component values based on said interval codeword and said base value determined by said base value generator; and a value selector arranged to select, for at least one image element in said image block and based on said index sequence, a component value from said multiple component values.

29. The block decompressor according to claim 28, wherein said codeword identifier is arranged to identify the other of said base codeword and said interval codeword in said compressed representation based on a determined bit length of said one of said base codeword and said interval codeword identified in said compressed representation by said codeword identifier.

30. The block decompressor according to claim 28, wherein said component value generator comprises:

an interval generator arranged to determine a length of an interval based on said interval codeword; and a value calculator arranged to calculate said multiple component values based on said interval length determined by said interval generator and said base value determined by said base value generator.

* * * * *